US010678544B2

United States Patent
Burger et al.

(10) Patent No.: US 10,678,544 B2
(45) Date of Patent: Jun. 9, 2020

(54) INITIATING INSTRUCTION BLOCK EXECUTION USING A REGISTER ACCESS INSTRUCTION

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 15/044,040

(22) Filed: Feb. 15, 2016

(65) Prior Publication Data
US 2017/0083314 A1   Mar. 23, 2017

Related U.S. Application Data

(60) Provisional application No. 62/221,003, filed on Sep. 19, 2015.

(51) Int. Cl.
  *G06F 9/30*   (2018.01)
  *G06F 9/38*   (2018.01)
  (Continued)

(52) U.S. Cl.
  CPC ............ *G06F 9/3016* (2013.01); *G06F 9/268* (2013.01); *G06F 9/3004* (2013.01);
  (Continued)

(58) Field of Classification Search
None
See application file for complete search history.

(56) References Cited

U.S. PATENT DOCUMENTS 5,142,631 A   8/1992   Murray et al.
5,317,734 A   5/1994   Gupta
(Continued)

FOREIGN PATENT DOCUMENTS

EP   0583089   2/1994
EP   2527972   11/2012
(Continued)

OTHER PUBLICATIONS

Bouwens et al., "Architecture Enhancements for the ADRES Coarse-Grained Reconfigurable Array," High Performance Embedded Architectures and Compilers, Springer Berlin Heidelberg pp. 66-81 (2008).
(Continued)

*Primary Examiner* — Corey S Faherty
(74) *Attorney, Agent, or Firm* — Klarquist Sparkman, LLP

(57) ABSTRACT

Apparatus and methods are disclosed for initiating instruction block execution using a register access instruction (e.g., a register Read instruction). In some examples of the disclosed technology, a block-based computing system can include a plurality of processor cores configured to execute at least one instruction block. The at least one instruction block encodes a data-flow instruction set architecture (ISA). The ISA includes a first plurality of instructions and a second plurality of instructions. One or more of the first plurality of instructions specify at least a first target instruction without specifying a data source operand. One or more of the second plurality of instructions specify at least a second target instruction and a data source operand that specifies a register.

20 Claims, 13 Drawing Sheets

(51) Int. Cl.

| | | |
|---|---|---|
| *G06F 15/80* | (2006.01) | |
| *G06F 9/32* | (2018.01) | |
| *G06F 9/26* | (2006.01) | |
| *G06F 11/36* | (2006.01) | |
| *G06F 12/0862* | (2016.01) | |
| *G06F 9/35* | (2018.01) | |
| *G06F 12/1009* | (2016.01) | |
| *G06F 13/42* | (2006.01) | |
| *G06F 12/0806* | (2016.01) | |
| *G06F 15/78* | (2006.01) | |
| *G06F 9/46* | (2006.01) | |
| *G06F 9/52* | (2006.01) | |
| *G06F 9/345* | (2018.01) | |
| *G06F 9/355* | (2018.01) | |
| *G06F 12/0875* | (2016.01) | |
| *G06F 12/0811* | (2016.01) | |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30047* (2013.01); *G06F 9/30058* (2013.01); *G06F 9/30072* (2013.01); *G06F 9/30076* (2013.01); *G06F 9/30087* (2013.01); *G06F 9/30098* (2013.01); *G06F 9/30101* (2013.01); *G06F 9/30105* (2013.01); *G06F 9/30145* (2013.01); *G06F 9/30167* (2013.01); *G06F 9/30189* (2013.01); *G06F 9/32* (2013.01); *G06F 9/345* (2013.01); *G06F 9/35* (2013.01); *G06F 9/3802* (2013.01); *G06F 9/383* (2013.01); *G06F 9/3804* (2013.01); *G06F 9/3822* (2013.01); *G06F 9/3824* (2013.01); *G06F 9/3836* (2013.01); *G06F 9/3838* (2013.01); *G06F 9/3842* (2013.01); *G06F 9/3848* (2013.01); *G06F 9/3851* (2013.01); *G06F 9/3853* (2013.01); *G06F 9/3855* (2013.01); *G06F 9/3859* (2013.01); *G06F 9/3867* (2013.01); *G06F 9/3891* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0806* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/13* (2018.01); *Y02D 10/14* (2018.01); *Y02D 10/151* (2018.01)

(56) References Cited

U.S. PATENT DOCUMENTS

| | | |
|---|---|---|
| 5,333,283 A | 7/1994 | Emma et al. |
| 5,615,350 A | 3/1997 | Hesson |
| 5,669,001 A | 9/1997 | Moreno |
| 5,729,228 A | 3/1998 | Franaszek et al. |
| 5,751,985 A | 5/1998 | Shen et al. |
| 5,790,822 A | 8/1998 | Sheaffer et al. |
| 5,796,997 A | 8/1998 | Lesartre et al. |
| 5,845,103 A | 12/1998 | Sodani et al. |
| 5,903,750 A | 5/1999 | Yeh et al. |
| 5,905,893 A | 5/1999 | Worrell |
| 5,917,505 A | 6/1999 | Larson |
| 5,943,501 A | 8/1999 | Burger et al. |
| 6,016,399 A | 1/2000 | Chang |
| 6,061,776 A | 5/2000 | Burger et al. |
| 6,161,170 A | 12/2000 | Burger et al. |
| 6,164,841 A | 12/2000 | Mattson et al. |
| 6,167,491 A | 12/2000 | McAlpine |
| 6,178,498 B1 | 1/2001 | Sharangpani et al. |
| 6,212,622 B1 | 4/2001 | Witt |
| 6,240,510 B1 | 5/2001 | Yeh et al. |
| 6,282,708 B1 | 8/2001 | Augusteijn et al. |
| 6,314,493 B1 | 11/2001 | Luick |
| 6,353,883 B1 | 3/2002 | Grochowski et al. |
| 6,493,820 B2 | 12/2002 | Akkary et al. |
| 6,529,922 B1 | 3/2003 | Hoge |
| 6,662,294 B1 | 12/2003 | Kahle et al. |
| 6,820,192 B2 | 11/2004 | Cho et al. |
| 6,892,292 B2 | 5/2005 | Henkel et al. |
| 6,918,032 B1 | 7/2005 | Abdallah et al. |
| 6,965,969 B2 | 11/2005 | Burger et al. |
| 6,988,183 B1 | 1/2006 | Wong |
| 7,032,217 B2 | 4/2006 | Wu |
| 7,085,919 B2 | 8/2006 | Grochowski et al. |
| 7,095,343 B2 | 8/2006 | Xie et al. |
| 7,299,458 B2 | 11/2007 | Hammes |
| 7,302,543 B2 | 11/2007 | Lekatsas et al. |
| 7,380,038 B2 | 5/2008 | Gray |
| 7,487,340 B2 | 2/2009 | Luick |
| 7,571,284 B1 | 8/2009 | Olson |
| 7,624,386 B2 | 11/2009 | Robison |
| 7,631,170 B2 | 12/2009 | Dowling |
| 7,676,650 B2 | 3/2010 | Ukai |
| 7,676,669 B2 | 3/2010 | Ohwada |
| 7,836,289 B2 | 11/2010 | Tani |
| 7,853,777 B2 | 12/2010 | Jones et al. |
| 7,877,580 B2 | 1/2011 | Eickemeyer et al. |
| 7,917,733 B2 | 3/2011 | Kazuma |
| 7,970,965 B2 | 6/2011 | Kedem et al. |
| 8,024,522 B1 | 9/2011 | Favor et al. |
| 8,055,881 B2 | 11/2011 | Burger et al. |
| 8,055,885 B2 | 11/2011 | Nakashima |
| 8,127,119 B2 | 2/2012 | Burger et al. |
| 8,180,997 B2 | 5/2012 | Burger et al. |
| 8,201,024 B2 | 6/2012 | Burger et al. |
| 8,250,555 B1 | 8/2012 | Lee et al. |
| 8,250,556 B1 | 8/2012 | Lee et al. |
| 8,312,452 B2 | 11/2012 | Neiger et al. |
| 8,321,850 B2 | 11/2012 | Bruening et al. |
| 8,433,885 B2 | 4/2013 | Burger et al. |
| 8,434,074 B2 | 4/2013 | Janczak et al. |
| 8,447,911 B2 | 5/2013 | Burger et al. |
| 8,464,002 B2 | 6/2013 | Burger et al. |
| 8,583,895 B2 | 11/2013 | Jacobs et al. |
| 8,589,892 B2 | 11/2013 | Fournier et al. |
| 8,677,105 B2 | 3/2014 | Abdallah |
| 8,817,793 B2 | 8/2014 | Mushano |
| 9,021,241 B2 | 4/2015 | Burger et al. |
| 9,043,769 B2 | 5/2015 | Vorbach |
| 9,053,292 B2 | 6/2015 | Abdallah |
| 2001/0032308 A1 | 10/2001 | Grochowski et al. |
| 2002/0016907 A1 | 2/2002 | Grochowski et al. |
| 2003/0023959 A1 | 1/2003 | Park |
| 2003/0070062 A1 | 4/2003 | Krishnan et al. |
| 2003/0088759 A1 | 5/2003 | Wilkerson |
| 2004/0083468 A1 | 4/2004 | Ogawa et al. |
| 2004/0139299 A1 | 7/2004 | Busaba et al. |
| 2004/0193849 A1 | 9/2004 | Dundas |
| 2004/0216095 A1 | 10/2004 | Wu |
| 2005/0172277 A1 | 8/2005 | Chheda et al. |
| 2005/0204348 A1 | 9/2005 | Horning et al. |
| 2006/0090063 A1 | 4/2006 | Theis |
| 2007/0226735 A1 | 9/2007 | Nguyen et al. |
| 2007/0239975 A1 | 10/2007 | Wang |
| 2007/0260854 A1 | 11/2007 | Smith et al. |
| 2007/0288733 A1 | 12/2007 | Luick |
| 2008/0109637 A1 | 5/2008 | Martinez et al. |
| 2009/0013135 A1 | 1/2009 | Burger et al. |

(56) References Cited

U.S. PATENT DOCUMENTS

| | | |
|---|---|---|
| 2009/0013160 A1 | 1/2009 | Burger et al. |
| 2009/0019263 A1 | 1/2009 | Shen et al. |
| 2009/0106541 A1 | 4/2009 | Mizuno et al. |
| 2009/0158017 A1 | 6/2009 | Mutlu et al. |
| 2009/0172365 A1 | 7/2009 | Orenstien et al. |
| 2009/0172371 A1 | 7/2009 | Joao et al. |
| 2009/0187739 A1 | 7/2009 | Nemirovsky et al. |
| 2010/0146209 A1 | 6/2010 | Burger et al. |
| 2010/0161948 A1 | 6/2010 | Abdallah |
| 2010/0191943 A1 | 7/2010 | Bukris |
| 2010/0325395 A1 | 12/2010 | Burger et al. |
| 2011/0035551 A1 | 2/2011 | Hooker et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0202749 A1 | 8/2011 | Jin et al. |
| 2012/0030451 A1 | 2/2012 | Pong et al. |
| 2012/0084759 A1 | 4/2012 | Candea et al. |
| 2012/0158647 A1 | 6/2012 | Yadappanavar et al. |
| 2012/0216012 A1 | 8/2012 | Vorbach et al. |
| 2012/0246448 A1 | 9/2012 | Abdallah |
| 2012/0246657 A1 | 9/2012 | Abdallah |
| 2012/0303933 A1 | 11/2012 | Manet et al. |
| 2012/0311306 A1 | 12/2012 | Mushano |
| 2013/0198499 A1 | 8/2013 | Dice et al. |
| 2014/0006714 A1 | 1/2014 | Cherukuri et al. |
| 2014/0136786 A1 | 5/2014 | Carpenter et al. |
| 2014/0181475 A1 | 6/2014 | Abdallah |
| 2014/0189239 A1 | 7/2014 | Hum et al. |
| 2014/0215190 A1 | 7/2014 | Mylius et al. |
| 2014/0281434 A1 | 9/2014 | Madriles et al. |
| 2014/0281436 A1 | 9/2014 | Mohammad |
| 2014/0372736 A1 | 12/2014 | Greenhalgh |
| 2015/0006452 A1 | 1/2015 | Kim et al. |
| 2015/0026444 A1 | 1/2015 | Anderson et al. |
| 2015/0067662 A1 | 3/2015 | Palalau |
| 2015/0089191 A1 | 3/2015 | Gonion |
| 2015/0100757 A1 | 4/2015 | Burger et al. |
| 2015/0127928 A1 | 5/2015 | Burger et al. |
| 2015/0186293 A1 | 7/2015 | Lin |
| 2015/0199199 A1 | 7/2015 | Burger et al. |
| 2015/0199272 A1 | 7/2015 | Goel et al. |
| 2016/0203081 A1 | 7/2016 | Kimura |
| 2016/0259645 A1 | 9/2016 | Wright |
| 2017/0083318 A1 | 3/2017 | Burger et al. |
| 2017/0083319 A1 | 3/2017 | Burger et al. |
| 2017/0083320 A1 | 3/2017 | Burger et al. |
| 2017/0083324 A1 | 3/2017 | Burger et al. |
| 2017/0083326 A1 | 3/2017 | Burger et al. |
| 2017/0083327 A1 | 3/2017 | Burger et al. |
| 2017/0083341 A1 | 3/2017 | Burger et al. |

FOREIGN PATENT DOCUMENTS

| | | |
|---|---|---|
| JP | 2001175473 A | 6/2001 |
| JP | 2002149401 A | 5/2002 |
| JP | 2013500539 A | 1/2013 |
| WO | WO 2010/147857 | 12/2010 |
| WO | WO 2013/095635 | 6/2013 |
| WO | WO 2014/193878 | 12/2014 |

OTHER PUBLICATIONS

Burger, et al., "Design and Implementation of the TRIPS EDGE Architecture", In Proceedings of the 32nd (100,000two-th) Annual International Symposium on Computer Architecture , Jun. 4, 2005, pp. 1-41.

Burger, et al., "Scaling to the End of Silicon with EDGE Architectures", In Journal of Computer, vol. 37, Issue 7, Jul. 12, 2004, pp. 44-55.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

"Explicit Data Graph Execution", Retrieved on: Sep. 24, 2015 Available at: https://en.wikipedia.org/wiki/Explicit_Data_Graph_Execution.

Fallin, et al., "The Heterogeneous Block Architecture", In Proceedings of 32nd IEEE International Conference on Computer Design, Oct. 19, 2014, pp. 1-8.

Gebhart et al., "An Evaluation of the TRIPS Computer System," In Proceedings of the 14th international conference on Architectural support for programming languages and operating systems, Mar. 7, 2009, 12 pages.

Govindan, "E3:Energy-Efficient EDGE Architectures", In Dissertation, Aug. 2010, 244 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gray and Smith, "Towards an Area-Efficient Implementation of a High ILP EDGE Soft Processor: Comparing Out-of-Order Dataflow Instruction Scheduler Designs," poster temporarily on display during The 22nd IEEE International Symposium on Field-Programmable Custom Computing Machines, May 11-13, 2014, Boston, Massachusetts (poster on display for approximately 1-2 hours, and less than one day, May 2014).

Gulati et al., "Multitasking Workload Scheduling on Flexible Core Chip Multiprocessors," In Proceedings of the Computer Architecture News, vol. 36, Issue 2, May 2008, 10 pages.

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.

Huang et al., "Compiler-Assisted Sub-Block Reuse," Retrieved on: Apr. 9, 2015; available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).

Huang, "Improving Processor Performance Through Compiler-Assisted Block Reuse," In Doctoral Dissertation, May 2000, 125 pages.

Keckler et al., "Tera-Op Reliable Intelligently Adaptive Processing System (Trips)," In AFRL-IF-WP-TR-2004-1514, document dated Apr. 2004, 29 Pages.

Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).

Kozumplik, et al., "TRIPS to the Semantic EDGE", Retrieved on: Sep. 22, 2015, Available at: http://vbn.aau.dk/ws/files/61072300/1212050422.pdf.

Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).

(56) References Cited

OTHER PUBLICATIONS

Li, et al., "Compiler-Assisted Hybrid Operand Communication", In Technical Report TR-09-33, Nov. 2009, 12 pages.
Li et al., "Hybrid Operand Communication for Dataflow Processors," document not dated, 10 pages (also published as Li et al., "Hybrid operand communication for dataflow processors," In Workshop on Parallel Execution of Sequential Programs on Multi-core Architectures, pp. 61-71 (2009)).
"Load/store architecture", Retrieved on: Sep. 24, 2015 Available at: http://en.wikipedia.org/wiki/Load/store_architecture.
Maher et al., "Merging Head and Tail Duplication for Convergent Hyperblock Formation," In Annual IEEE/ACM International Symposium on Microarchitecture, Dec. 2006, 12 pages.
McDonald, et al., "TRIPS Processor Reference Manual", In Tech Report TR-05-19, Mar. 10, 2005, 194 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Munshi, et al., "A Parameterizable SIMD Stream Processor", In Proceedings of Canadian Conference on Electrical and Computer Engineering, May 1, 2005, pp. 806-811.
Nagarajan et al., "Critical Path Analysis of the TRIPS Architecture," In IEEE International Symposium on Performance Analysis of Systems and Software, Mar. 19, 2006, 11 pages.
Nagarajan et al., "A Design Space Evaluation of Grid Processor Architectures," In Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).
Robatmili et al., "Exploiting Criticality to Reduce Bottlenecks in Distributed Uniprocessors," 17$^{th}$ IEEE International Symposium on High-Performance Computer Architecture (HPCA-17), Feb. 2011, 12 pages.
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Roesner, "Counting Dependence Predictors," In Undergraduate Honors Thesis, May 2, 2008, 25 pages.
Sankaralingam, et al., "Distributed Microarchitectural Protocols in the TRIPS Prototype Processor", In Proceedings of 39th Annual IEEE/ACM International Symposium on Microarchitecture, Dec. 9, 2006, pp. 1-12.
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sankaralingam, Karthikeyan, "Polymorphous Architectures: A Unified Approach for Extracting Concurrency of Different Granularities", In Doctoral Dissertation of Philosophy, Aug. 2007, 276 pages.

Sethumadhavan et al., "Design and Implementation of the TRIPS Primary Memory System," In Proceedings of International Conference on Computer Design, Oct. 1, 2006, 7 pages.
Sibi et al., "Scaling Power and Performance via Processor Composability," University of Texas at Austin technical report No. TR-10-14 (2010), 20 pages.
Smith et al., "Compiling for EDGE Architectures," In Proceedings of International Symposium on Code Generation and Optimization, Mar. 26, 2006, 11 pages.
Smith et al., "Dataflow Predication", In Proceedings of 39th Annual IEEE/ACM International Symposium on Microarchitecture, Dec. 9, 2006, 12 pages.
Smith, Aaron Lee, "Explicit Data Graph Compilation", In Doctoral Dissertation of Philosophy, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Tamches et al., "Dynamic Kernel Code Optimization," In Workshop on Binary Translation, 2001, 10 pages.
Wu, et al., "Block Based Fetch Engine for Superscalar Processors", In Proceedings of the 15th International Conference on Computer Applications in Industry and Engineering, Nov. 7, 2002, 4 pages.
PCT Chapter II Demand for International Preliminary Examination and amended claims under Article 34 submitted to the European Patent Office dated Mar. 22, 2017, for PCT/US2016/051209, pp. 1-3.
Written Opinion of the International Preliminary Examining Authority for PCT/US2016/051209, dated Aug. 23, 2017, pp. 1-5.
PCT Chapter II Demand for International Preliminary Examination and amended claims under Article 34 submitted to the European Patent Office dated Mar. 22, 2017, for PCT/US2016/051409, pp. 1-3.
International Search Report and Written Opinion for PCT/US2016/051209, dated Dec. 16, 2016, 10 pages.
Cain et al., "Memory Ordering: A Value-Based Approach", In Journal of IEEE Micro, vol. 24, Issue 1, Jan. 2004, pp. 110-117.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Ipek et al., "Core Fusion: Accommodating Software Diversity in Chip Multiprocessors", In Proceedings of the 34th annual international symposium on Computer architecture, Jun. 9, 2007, 12 pages.
Kavi, et al., "Concurrency, Synchronization, Speculation—the Dataflow Way", In Journal of Advances in Computers, vol. 96, Nov. 23, 2013, pp. 1-41.
Liu, "Hardware Techniques to Improve Cache Efficiency," In Dissertation of the University of Texas at Austin, May 2009, 189 pages.
Maher, "Atomic Block Formation for Explicit Data Graph Execution Architectures," In Dissertation of Doctor of Philosophy, Aug. 2010, 185 pages.
McDonald et al., "Characterization of TCC on Chip-Multiprocessors," Parallel Architectures and Compilation Techniques, 2005. PACT 2005. 14th International Conference on. IEEE, 2005, 12 pages.
Pengfei et al., "M5 Based EDGE Architecture Modeling", In Proceedings of IEEE International Conference on Computer Design, Oct. 3, 2010, pp. 289-296.
Pierce et al., "Wrong-Path Instruction Prefetching", In Proceedings of the 29th Annual IEEE/ACM International Symposium on Microarchitecture, Dec. 2, 1996, pp. 1-17.
Roesner, et al., "Counting Dependence Predictors", In Proceedings of the 35th Annual International Symposium on Computer Architecture, Jun. 21, 2008, 12 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Souza et al., "Dynamically Scheduling VLIW Instructions", In Journal of Parallel and Distributed Computing, vol. 60, Jul. 2000, pp. 1480-1511.

(56) References Cited

OTHER PUBLICATIONS

Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
"International Preliminary Report on Patentability Issued in PCT Application No. PCT/US2016/051209", dated Dec. 13, 2017, 6 Pages.
"Non Final Office Action Issued in U.S. Appl. No. 14/757,941", dated Jan. 11, 2019, 16 Pages.
"Final Office Action Issued in U.S. Appl. No. 14/942,345", dated Dec. 31, 2018, 14 Pages.
"Non Final Office Action Issued in U.S. Appl. No. 14/942,461", dated Jan. 18, 2019, 9 Pages.
"Final Office Action Issued in U.S. Appl. No. 14/942,557", dated Dec. 31, 2018, 16 Pages.
"Non Final Office Action Issued in U.S. Appl. No. 15/073,365", dated Dec. 4, 2018, 13 Pages.
"Final Office Action Issued in U.S. Appl. No. 15/074,938", dated Dec. 3, 2018, 9 Pages.
Salzman, et al., "The Art of Debugging with GDB and DDD", In Book—The Art of Debugging with GDB and DDD, No Starch Press Publication, Sep. 2008, 27 Pages.
"Office Action Issued in European Patent Application No. 16766815.1", dated Nov. 14, 2019, 15 Pages.
"Final Office Action Issued in U.S. Appl. No. 14/921,855", dated Sep. 20, 2019, 11 Pages.
"Non Final Office Action Issued in U.S. Appl. No. 14/921,855", dated Apr. 17, 2019, 28 Pages.
"Non Final Office Action Issued in U.S. Appl. No. 15/012,674", dated Jun. 24, 2019, 10 Pages.
"Very Long Instruction Word", Retrieved From: http://en.wikipedia.org/wiki/Verylong_instruction_word, Feb. 13, 2013, 7 Pages.
"Final Office Action Issued in U.S. Appl. No. 14/757,944", dated Jul. 9, 2018, 18 Pages.
"Non Final Office Action Issued in U.S. Appl. No. 14/757,944", dated Sep. 21, 2017, 21 Pages.
August, et al., "A Framework for Balancing Control Flow and Predication", In IEEE/ ACM 30th Annual International Symposium on Microarchitecture, Dec. 3, 1997, 12 Pages.
Chang, et al., "Using Predicated Execution to Improve the Performance of a Dynamically Scheduled Machine with Speculative Execution", In International Journal of Parallel Programming, vol. 24, Issue 3, Jun. 1996, 11 Pages.
Chuang, et al., "Predicate Prediction for Efficient Out-of-Order Execution", In Proceedings of the 17th Annual International Conference on Supercomputing, Jun. 23, 2003, 10 Pages.
Coons, et al., "Optimal Huffman Tree-Height Reduction for Instruction-Level Parallelism", In Technical Report TR-08-34, Aug. 2007, 26 Pages.
Ebcioglu, et al., "An Eight-Issue Tree-VLIW Processor for Dynamic Binary Translation", In Proceedings of the International Conference on Computer Design, Nov. 1998, 9 Pages.
Ferrante, et al., "The Program Dependence Graph and Its Use in Optimization", In Proceedings of ACM Transactions on Programming Languages and Systems, vol. 9, Issue 3, Jul. 1, 1987, 31 Pages.
Havanki, et al., "Treegion Scheduling for Wide Issue Processors", In Proceedings of the 4th International Symposium on High-Performance Computer Architecture, Feb. 1, 1998, 11 Pages.
Huh, et al., "A NUCA Substrate for Flexible CMP Cache Sharing", In Proceedings of 19th International Conference on Supercomputing, Jun. 20, 2005, 10 Pages.

Mahlke, et al., "Effective Compiler Support for Predicated Execution Using the Hyperblock", In Proceedings of the 25th Annual International Symposium on Microarchitecture, Dec. 1992, 10 Pages.
Mahlke, Scott Alan, "Exploiting Instruction Level Parallelism in the Presence of Conditional Branches", In Doctoral Dissertation Submitted in the Department of Electrical and Computer Engineering, Sep. 1996, 292 Pages.
Mai, et al., "Smart Memories: A Modular Reconfigurable Architecture", In Proceedings of the 27th International Symposium on Computer Architecture, Jun. 14, 2011, 11 Pages.
McDonald, et al., "The Design and Implementation of the TRIPS Prototype Chip", Retrieved From: http://www.cs.utexas.edu/-trips/talks/hotchips05.pdf, Aug. 17, 2005, 24 Pages.
Moreno, et al., "Scalable Instruction-level Parallelism through Tree-Instructions", In Proceedings of the 11th International Conference on Supercomputing, Jul. 11, 1997, 14 Pages.
Netto, et al., "Code Compression to Reduce Cache Accesses", In Technical Report—IC-03-023, Nov. 2003, 15 Pages.
Pan, et al., "High Performance, Variable-Length Instruction Encodings", In Doctoral Dissertation of Massachusetts Institute of Technology, May 2002, 53 Pages.
Parcerisa, et al., "Design of Clustered Superscalar Microarchitectures", In Thesis Submitted to Polytechnic University of Catalonia, Apr. 2004, 28 Pages.
"International Search Report and Written Opinion Issued in PCT Application No. PCT/US2016/051207", dated Dec. 16, 2016, 11 Pages.
Pnevmatikatos, et al., "Guarded Execution and Branch Prediction in Dynamic ILP Processors", In Proceedings of the 21st Annual International Symposium on Computer Architecture, Apr. 1994, 11 Pages.
Quinones, et al., "Improving Branch Predication and Predicated Execution in Out-of-Order Processors", In IEEE 13th International Symposium on High Performance Computer Architecture, Feb. 10, 2007, 10 Pages.
Quinones, et al., "Selective Predicate Prediction for Out-of-Order Processors", In Proceedings of the 20th Annual International Conference on Supercomputing, Jun. 28, 2009, 9 Pages.
Ranganathan, Nitya, "Control Flow Speculation for Distributed Architectures", In Dissertation Presented to the Faculty of the Graduate School of The University of Texas at Austin, May 2009, 40 Pages.
Ross, et al., "A Hamming Distance Based VLIW/EPIC Code Compression Technique", In Proceedings of the International Conference on Compilers, Architecture, and Synthesis for Embedded Systems, Sep. 22, 2004, 8 Pages.
Sankaralingam, et al., "Universal Mechanisms for Data-Parallel Architectures", In Proceedings of the 36th International Symposium on Microarchitecture, Dec. 3, 2003, 12 Pages.
Simon, et al., "Incorporating Predicate Information Into Branch Predictors", In Proceedings of the 9th International Symposium on High-Performance Computer Architecture, Feb. 2003, 12 Pages.
Sohi, et al., "High-Bandwidth Data Memory Systems for Superscalar Processors", In Proceedings of the 4th International Conference on Architectural Support for Programming Languages and Operating Systems Homepage, Apr. 1991, 8 Pages.
Uht, et al., "Disjoint Eager Execution: An Optimal Form of Speculative Execution", In Proceedings of the 28th International Symposium on Microarchitecture, Nov. 1995, 13 Pages.
Wilson, et al., "Designing High Bandwidth On-Chip Caches", In Proceedings of the 24th Annual International Symposium on Computer Architecture, Jun. 1997, 12 Pages.
Xie, et al., "A Code Decompression Architecture for VLIW Processors", In Proceedings of 34th ACM/IEEE International Symposium on Microarchitecture, Dec. 1, 2001, 10 Pages.

```
I[0]   read   R0    T[2R] T[3L]    // read x from R0
I[1]   read   R1    T[3R]          // read y from R1
I[2]   addi   #1    T[6L]          // x++;
I[3]   add          T[5L] W[R2]    // z = x + y; (write z to R2)
I[4]   read   R4    T[5R]          // read b from R4
I[5]   add          T[6R] W[R3]    // a = b + z; (write a to R3)
I[6]   div          W[R0]          // x /= a; (write x to R0)
I[7]   bro    nextBlockPC          // branch to the next block
```

FIG. 10

```
++i;
if(a[i]>a[i+1] {
   t      = a[i];
   a[i]    = a[i+1];
   a[i+1] = t;
}
else {
   b[i]=b[i]+s;
} b[1] = 0xff;
x    = b[2];
```

```
//  opcd     src bid  lsid   target(s)
 0: readl    R1                T[3R]              // i
 1: readl    R2                T[3L]              // a
 2: readl    R3                T[14L]             // b
 3: addi     #1                B1R                // ++i
 4: add          B1R           T[5R]  T[6R]       // &a[i] (i.e., a+i)
 5: mov                        T[7R]  T[8R]
 6: mov                        T[12R] T[13R]
 7: ld       #0        0       T[9R]              // a[i]
 8: ld       #1        1       T[10R]             // a[i+1]
 9: mov                        T[13L] T[11L]      // a[i]
10: mov                        T[12L] T[11R]      // a[i+1]
11: tgt                        B2P                // a[i] > a[i+1] ?
12: sd_t         B2P   2                          // a[i]   = a[i+1]
13: sd_t         B2P   3                          // a[i+1] = t (i.e., a[i])
14: mov                        T[15L] T[20R]      // b
15: add          B1R           T[16R] T[19R]      // &b[i]
16: ld_f    #0 B2P     4       T[18R]             // b[i]
17: readl_f R4 B2P             T[18L]             // s
18: add_f       B2P            T[19L]             // b[i]+s
19: sd_f        B2P    5                          // b[i] = b[i]+s
20: addi    #1                 T[22R]             // &b[1]
21: movi    #ff                T[22L]             // 0xff
22: sd                 6                          // b[1]=0xff
23: addi #2                    T[23R]             // &b[2]
24: ld #2              7       T[25R]             // b[2]
25: mov                        W[R5]              // x=b[2]
```

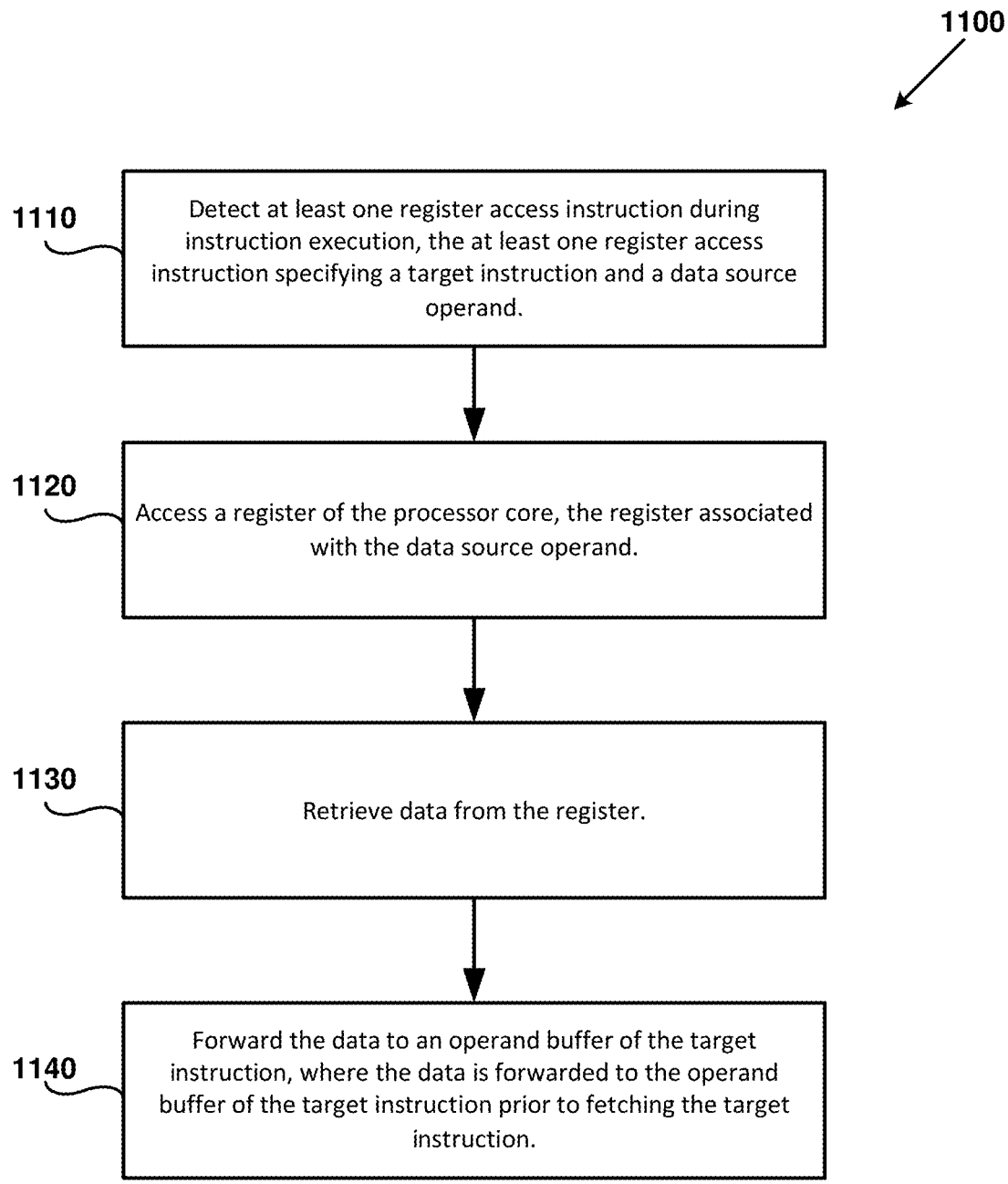

INITIATING INSTRUCTION BLOCK EXECUTION USING A REGISTER ACCESS INSTRUCTION

CROSS-REFERENCE TO RELATED APPLICATIONS

This application claims the benefit of U.S. Provisional Patent Application No. 62/221,003, entitled "BLOCK-BASED PROCESSORS," filed Sep. 19, 2015, the entire disclosure of which is incorporated herein by reference in its entirety.

BACKGROUND

Microprocessors have benefited from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for configuring, operating, and compiling code for, block-based instruction set architectures (BB-ISAs), including explicit data graph execution (EDGE) architectures using register access instructions (e.g., a register Read instruction) to initiate instruction block execution. The described techniques and tools can potentially improve processor performance and can be implemented separately, or in various combinations with each other. As will be described more fully below, the described techniques and tools can be implemented in a digital signal processor, a microprocessor, an application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, PDAs, touch screen tablet devices, tablet computers, wearable computers, and laptop computers.

In some examples of the disclosed technology, a block-based processor includes a plurality of processor cores configured to execute at least one instruction block. The at least one instruction block encodes a data-flow instruction set architecture (ISA), where the data-flow ISA includes at least a first and a second plurality of instructions. For example, the first plurality of instructions specify one or more target instructions without specifying a data source operand (e.g., an Add instruction), and the second plurality of instructions specify one or more other target instructions and a data source operand. A register access instruction (e.g., a register Read instruction) can be part of the second plurality of instructions. One or more register Read instructions can be used as initial instructions in an instruction block, where the register Read instructions can fetch data, which can be supplied as operands to one or more subsequent instructions (e.g., an Add instruction). The register Read instruction can be executed and the result from the Read instruction execution can be forwarded to an operand buffer for one or more subsequent target instructions. Additionally, the result from the Read instruction can be forwarded to the operand buffer even before the target instruction is fetched and decoded. Furthermore, register Read instructions may be predicated upon satisfaction of a condition associated with a predicate instruction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 10 illustrates example source and assembly code as can be used in certain examples of the disclosed technology.

FIGS. 11-12 are flowchart outlining example methods of instruction block execution, as can be used in certain examples of the disclosed technology.

DETAILED DESCRIPTION

I. General Considerations

Figure 1:
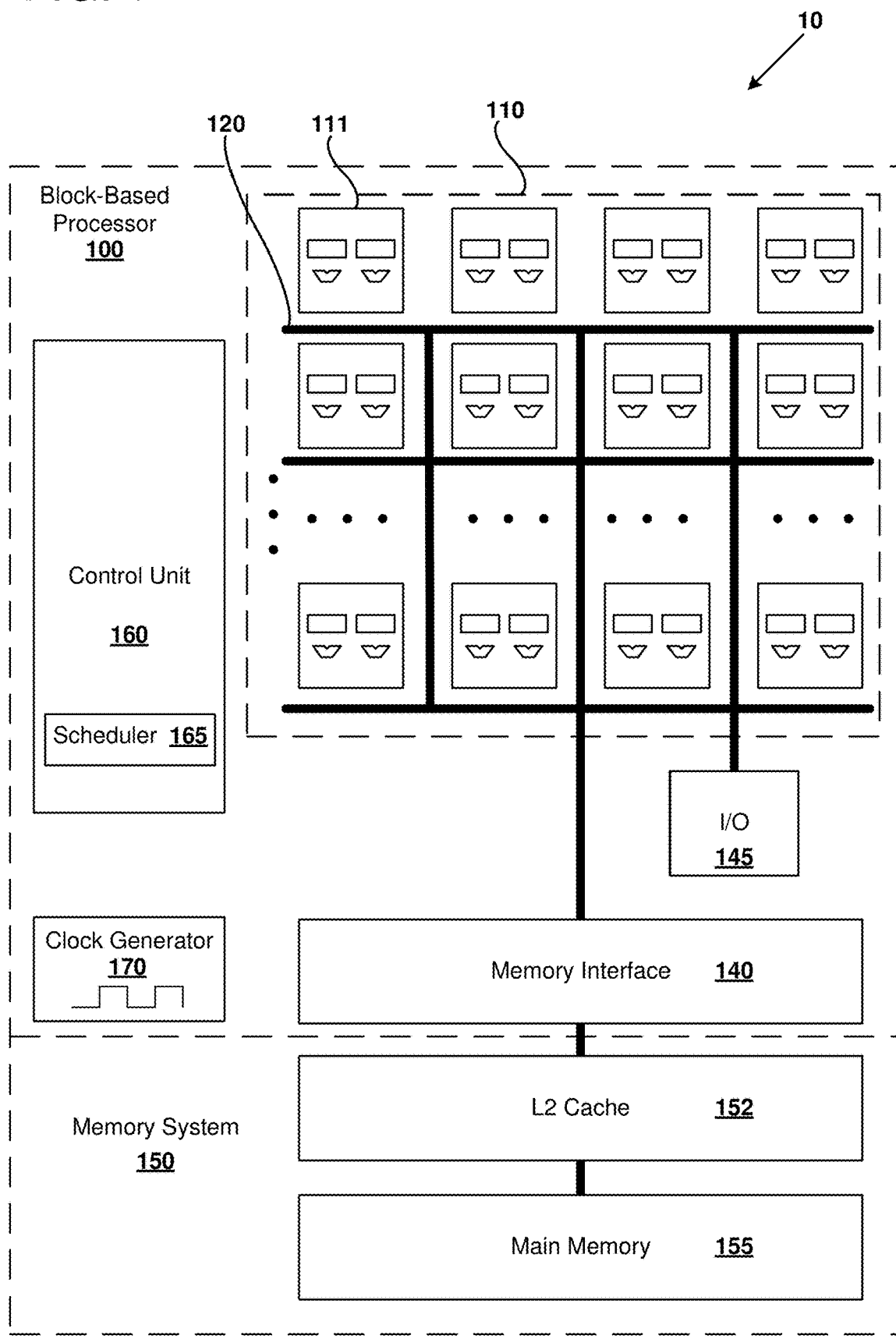
FIG. 1 illustrates a block-based processor core including multiple processor cores, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and sub-combinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive energy-consuming circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize energy efficiency and/or performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor including multiple processor cores uses an explicit data graph execution (EDGE) ISA designed for area- and energy-efficient, high-ILP execution. In some examples, use of EDGE architectures and associated compilers finesses away much of the register renaming, CAMs, and complexity. In some examples, the respective cores of the block-based processor can store or cache fetched and decoded instructions that may be repeatedly executed, and the fetched and decoded instructions can be reused to potentially achieve reduced power and/or increased performance.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Intermediate results produced by the instructions within an atomic instruction block are buffered locally until the instruction block is committed. When the instruction block is committed, updates to the visible architectural state resulting from executing the instructions of the instruction block are made visible to other instruction blocks. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using visible architectural state such as memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

Apparatus, methods, and computer-readable storage media are disclosed for initiating instruction block execution using memory access instructions. In certain examples of the disclosed technology, instruction blocks include an instruction block header and a plurality of instructions. One or more register Read instructions can be used to initiate execution of the instruction block. Additionally, the register Read instructions can be predicated so that they are executed upon satisfaction (occurrence) of a given condition associated with a predicated instruction.

As will be readily understood to one of ordinary skill in the relevant art, a spectrum of implementations of the disclosed technology are possible with various area, performance and power tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1, an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface 140 can include a memory management unit (MMU) for managing and allocating virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit can communicate with the processing cores 110, the I/O interface 145, and the memory interface 140 via the core interconnect 120 or a side-band interconnect (not shown). The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can generate and control the processor according to control flow and metadata information representing exit points and control flow probabilities for instruction blocks.

The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler 165 that is used to allocate instruction blocks to the processor cores 110. As used herein, scheduler allocation refers to hardware for directing operation of an instruction blocks, including initiating instruction block mapping, fetching, decoding, execution, committing, aborting, idling, and refreshing an instruction block. In some examples, the hardware receives signals generated using computer-executable instructions to direct operation of the instruction scheduler. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The scheduler 165 schedules the flow of instructions including allocation and de-allocation of cores for performing instruction processing, control of input data and output data between any of the cores, register files, the memory interface 140, and/or the I/O interface 145.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allow power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
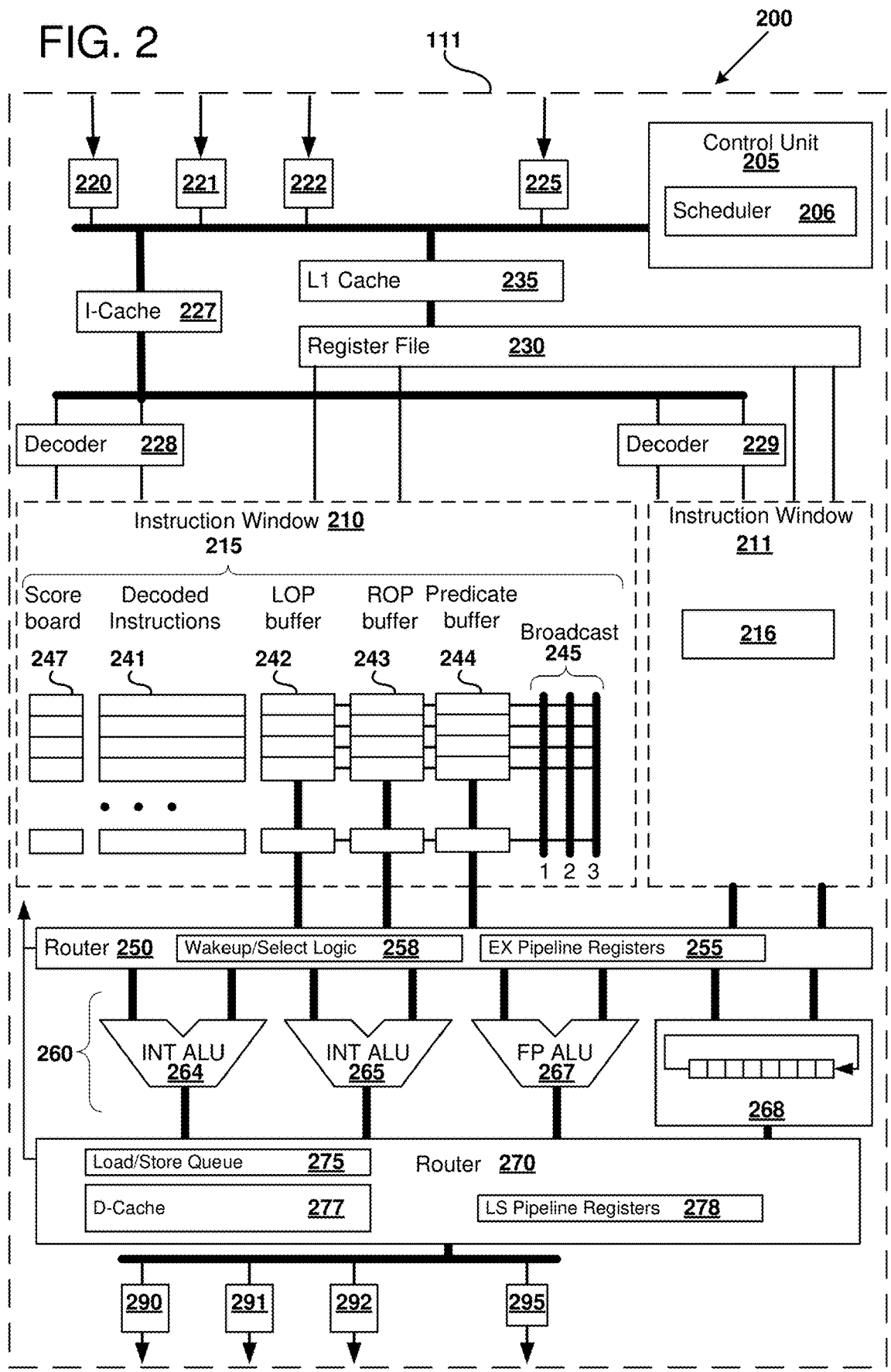
FIG. 2 illustrates a block-based processor core, as can be used in some examples of the disclosed technology.

FIG. 2 is a block diagram 200 further detailing an example microarchitecture for the block-based processor 100, and in particular, an instance of one of the block-based processor cores (e.g., processor core 111), as can be used in certain examples of the disclosed technology. For ease of explanation, the exemplary block-based processor core 111 is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

In some examples of the disclosed technology, the processor core 111 can be used to execute and commit an instruction block of a program. As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include generating and using generating and using memory access instruction encodings, allocation and de-allocation of cores for performing instruction processing, control of input data and output data between any of the cores, register files, the memory interface 140, and/or the I/O interface 145. The control unit can also control the load-store queue, scheduler, global control unit, other units, or a combination of these units used to determine the rate and order of instruction issue.

In some examples, the instruction scheduler 206 is implemented using a general-purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

The control unit 205 further includes memory (e.g., in an SRAM or register) for storing control flow information and metadata (e.g., data for memory access instruction order, store masks, store vectors, and so forth. The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header can include information describing an execution mode of the instruction block and information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 located in each respective instruction window 210 and 211. Further, each of the decoders 228 and 229 can send data to the control unit 205, for example, to configure operation of the processor core 111 according to execution flags specified in an instruction block header or in an instruction.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers can be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associated with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, a predicate buffer 244, three broadcast channels 245, and an instruction scoreboard 247. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands and predicates are read from the operand buffers 242 and 243 and predicate buffer 244, respectively, not the register file. The instruction scoreboard 247 can include a buffer for predicates directed to an instruction, including wire-OR logic for combining predicates sent to an instruction by multiple instructions.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). In one embodiment, the control unit can fetch and decode two instructions per clock cycle into each of the instruction windows 210 and 211. In alternative embodiments, the control unit can fetch and decode one, four, or another number of instructions per clock cycle into a corresponding number of instruction windows. The control unit 205 provides instruction window dataflow scheduling logic to monitor the ready state of each decoded instruction's inputs (e.g., each respective instruction's predicate(s) and operand(s) using the scoreboard 247. When all of the inputs (e.g., operands and predicate(s)) for a particular decoded instruction are ready, the instruction is ready to issue. The control unit 205 then initiates execution of one or more next instruction(s) (e.g., the lowest numbered ready instruction) each cycle, and a decoded instruction and the instruction's input operands are sent to one or more of functional units 260 for execution. The decoded instruction can also encode a number of ready events. The scheduler in the control unit 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and instructions can be scheduled in a first-in first-out (FIFO) order from the ready queue. For instructions encoded with load store identifiers (LSIDs), the execution order will also follow the priorities enumerated in the instruction LSIDs, or by executed in an order that appears as if the instructions were executed in the specified order.

Information stored in the scoreboard 247 can include, but is not limited to, the associated instruction's execution predicate (such as whether the instruction is waiting for a predicate bit to be calculated and whether the instruction executes if the predicate bit is true or false), availability of operands to the instruction, or other prerequisites required before executing the associated individual instruction.

In one embodiment, the scoreboard 247 can include decoded ready state, which is initialized by the instruction decoder 228, and active ready state, which is initialized by the control unit 205 during execution of the instructions. For example, the decoded ready state can encode whether a respective instruction has been decoded, awaits a predicate and/or some operand(s), perhaps via a broadcast channel, or is immediately ready to issue. The active ready state can encode whether a respective instruction awaits a predicate and/or some operand(s), is ready to issue, or has already issued. The decoded ready state can be cleared on a block reset or a block refresh. Upon branching to a new instruction block, the decoded ready state and the active ready state is cleared (a block or core reset). However, when an instruction block is re-executed on the core, such as when it branches back to itself (a block refresh), only active ready state is cleared. Block refreshes can occur immediately (when an instruction block branches to itself) or after executing a number of other intervening instruction blocks. The decoded ready state for the instruction block can thus be preserved so that it is not necessary to re-fetch and decode the block's instructions. Hence, block refresh can be used to save time and energy in loops and other repeating program structures.

The number of instructions that are stored in each instruction window generally corresponds to the number of instructions within an instruction block. In some examples, the number of instructions within an instruction block can be 32, 64, 128, 1024, or another number of instructions. In some examples of the disclosed technology, an instruction block is allocated across multiple instruction windows within a processor core. In some examples, the instruction windows 210, 211 can be logically partitioned so that multiple instruction blocks can be executed on a single processor core. For example, one, two, four, or another number of instruction blocks can be executed on one core. The respective instruction blocks can be executed concurrently or sequentially with each other.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. The first router 250 further includes wakeup/select logic 258, which is used to determine when memory instructions are sent to a load/store queue 275. For example, the wakeup/select logic 258 can determine if all source operands and predicate conditionals are available for a memory access instruction and based on the determination, send the address (and data, if applicable) to the load/store queue 275.

Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 include the load/store queue 275, which can be used to issue memory instructions, a data cache 277, which stores data being input to or output from the core to memory, and load/store pipeline register 278.

The load/store queue 275 receives and temporarily stores information for performing memory access instructions. The instruction block can execute all the memory access instructions as a single, atomic transactional block. In other words, either all or none of the memory access instructions are performed. The relative order in which memory access instructions is determined based on LSIDs associated with each memory access instruction (e.g., an LSID encoded with the corresponding instruction) and in some cases, the store mask. In some examples, additional performance can be obtained by executing the memory access instructions out of the LSID-specified relative ordering, but the state of memory must still appear as if the instructions were executed in order. The load/store queue 275 also receives addresses for load instructions, and addresses and data for store instructions. In some examples, the load/store queue waits to perform the queued memory access instructions until it is determined that the containing instruction block will actually commit. In other examples, the load/store queue 275 can issue at least some memory access instructions speculatively, but will need to flush the memory operations in the event the block does not commit. In other examples, the control unit 205 determines the order in which memory access instructions are executed, by providing functionalities described as being performed by the wakeup/select logic and/or load/store queue 275. In some examples, the processor 100 includes a debug mode that allows for step-by-step issuance of memory access instructions with the aid of a debugger. The load/store queue 275 can be implemented using control logic (e.g., with a finite state machine) and memory (e.g., registers or SRAM) to execute the memory transactions and store memory instruction operands, respectively.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control unit 205 of the processor cores 110. The area, clock period, capabilities, and limitations substantially determine the realized performance of the individual cores 110 and the throughput of the block-based processor cores 110.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some examples, the instruction scheduler 206 is implemented using storage (e.g., first-in first-out (FIFO) queues, content addressable memories (CAMs)) storing data indicating information used to schedule execution of instruction blocks according to the disclosed technology. For example, data regarding instruction dependencies, transfers of control, speculation, branch prediction, and/or data loads and stores are arranged in storage to facilitate determinations in mapping instruction blocks to processor cores. For example, instruction block dependencies can be associated with a tag that is stored in a FIFO or CAM and later accessed by selection logic used to map instruction blocks to one or more processor cores. In some examples, the instruction scheduler 206 is implemented using a general purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

In some cases, the scheduler 206 accepts events for target instructions that have not yet been decoded and must also inhibit reissue of issued ready instructions. Instructions can be non-predicated, or predicated (based on a true or false condition). A predicated instruction does not become ready until it is targeted by another instruction's predicate result, and that result matches the predicate condition. If the associated predicate condition does not match, the instruction never issues. In some examples, predicated instructions may be issued and executed speculatively. In some examples, a processor can subsequently check that speculatively issued and executed instructions were correctly speculated. In some examples a mis-speculated issued instruction and the specific transitive closure of instructions in the block that consume its outputs can be re-executed, or mis-speculated side effects annulled. In some examples, discovery of a mis-speculated instruction leads to the complete roll back and re-execution of an entire block of instructions. In some examples, the scheduler performs some or all of the operations described as being performed by the wakeup/selection logic and/or load/store queue discussed above.

Upon branching to a new instruction block, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
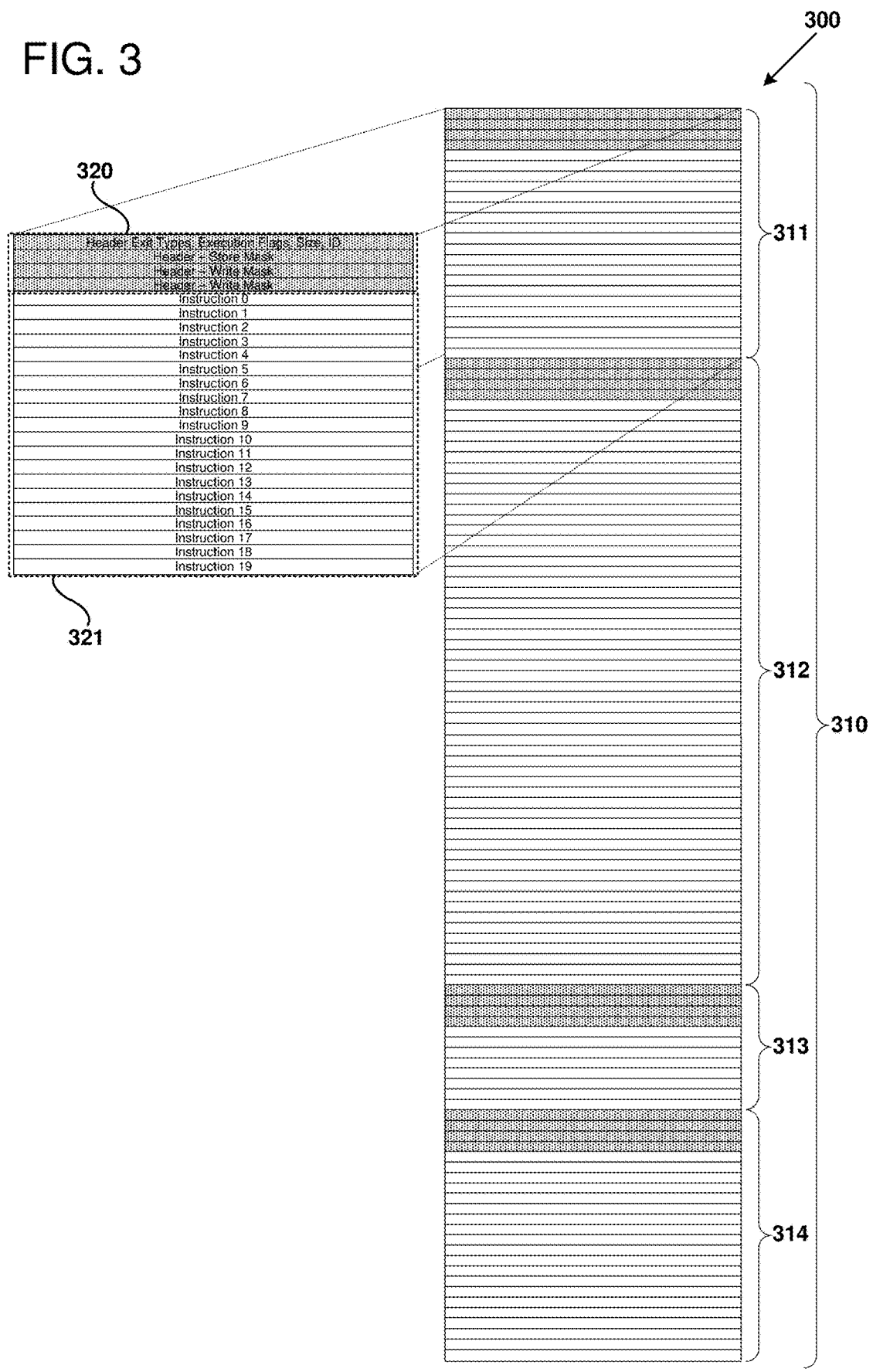
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. The stream of instructions can be stored in memory, received from another process in memory, received over a network connection, or stored or received in any other suitable manner. In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include execution flags, which indicate special instruction execution requirements. For example, branch prediction or memory dependence prediction can be inhibited for certain instruction blocks, depending on the particular application. As another example, an execution flag can be used to control whether the instruction block is executed in the default execution mode or the debug execution mode.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or bad jump detection. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 320 also includes a store mask that indicates which of the load-store queue identifiers encoded in the block instructions are assigned to store operations. For example, for a block with eight memory access instructions, a store mask 01011011 would indicate that there are three memory store instructions (bits 0, corresponding to LSIDs 0, 2, and 5) and five memory load instructions (bits 1, corresponding to LSIDs 1, 3, 4, 6, and 7). The instruction block header can also include a write mask, which identifies which global register(s) the associated instruction block will write. In some examples, the store mask is stored in a store vector register by, for example, an instruction decoder (e.g., decoder 228 or 229). In other examples, the instruction block header 320 does not include the store mask, but the store mask is generated dynamically by the instruction decoder by analyzing instruction dependencies when the instruction block is decoded. For example, the decoder can analyze load store identifiers of instruction block instructions to determine a store mask and store the store mask data in a store vector register. Similarly, in other examples, the write mask is not encoded in the instruction block header, but is generated dynamically (e.g., by analyzing registers referenced by instructions in the instruction block) by an instruction decoder) and stored in a write mask register. The store mask and the write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 321 can include instructions for executing integer and floating-point arithmetic, logical operations, type conversions, register reads and writes, memory loads and stores, execution of branches and jumps, and other suitable processor instructions. In some examples, the instructions include one or more register access instructions (e.g., a register Read instruction), which can be used to initiate instruction processing for a block of instructions.

In another example of the disclosed technology, the instruction block header 320 may not have any register access (e.g. register Read) commands. Instead, register Read instructions may be used within the instruction block 321. In this regard, more efficient and compact memory header may be generated since register Read commands for an entire bank of registers can be removed from the header, and only targeted register Read commands can be used in the instruction block. This results in saved block header resource space as well as more efficient register access during instruction block execution.

VI. Example Block Instruction Target Encoding

Figure 4:
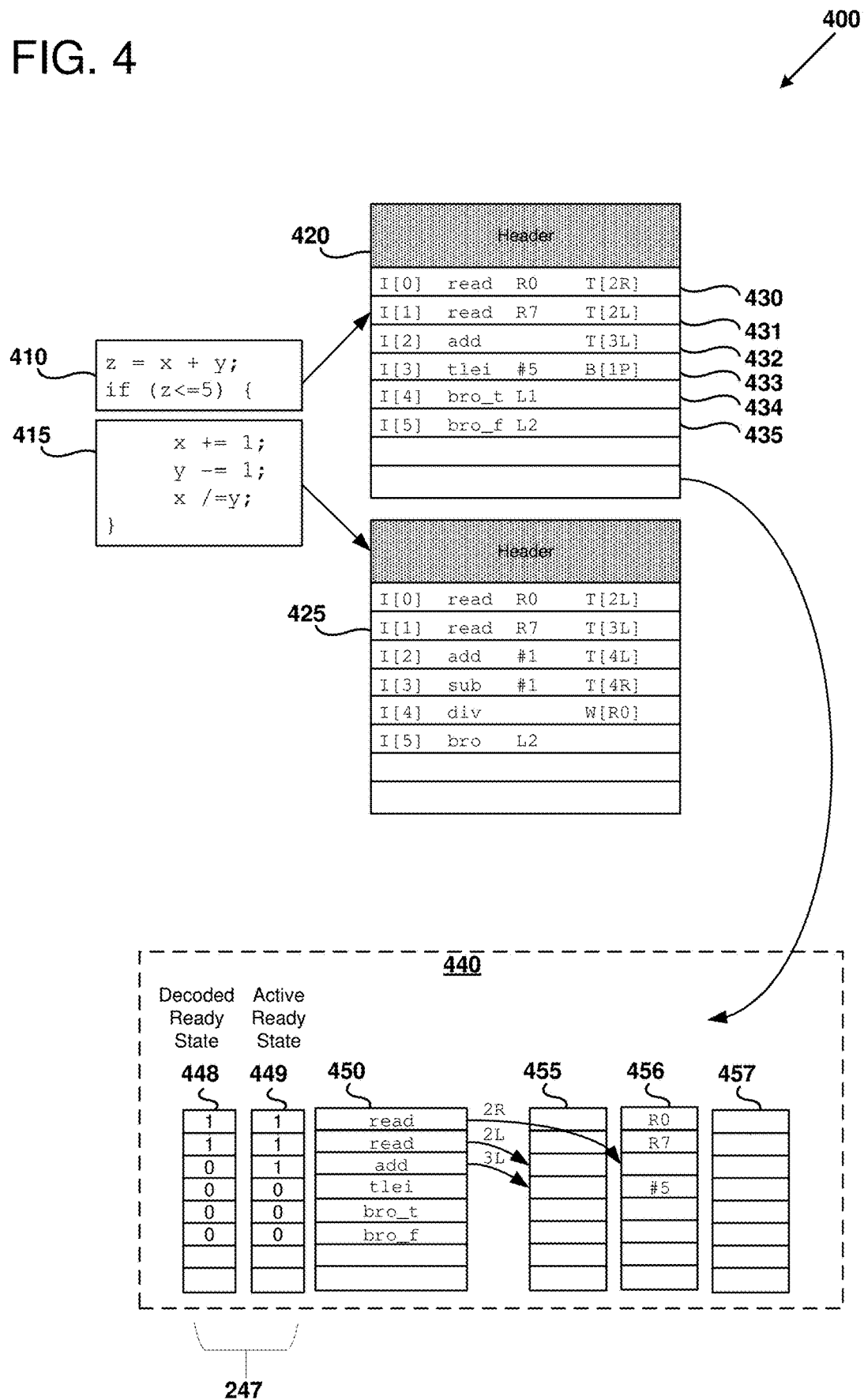
FIG. 4 illustrates portions of source code and respective instruction blocks, as can be used in some examples of the disclosed technology.

FIG. 4 is a diagram 400 depicting an example of two portions 410 and 415 of C language source code and their respective instruction blocks 420 and 425 (in assembly language), illustrating how block-based instructions can explicitly encode their targets. The high-level C language source code can be translated to the low-level assembly language and machine code by a compiler whose target is a block-based processor. A high-level language can abstract out many of the details of the underlying computer architecture so that a programmer can focus on functionality of the program. In contrast, the machine code encodes the program according to the target computer's ISA so that it can be executed on the target computer, using the computer's hardware resources. Assembly language is a human-readable form of machine code.

In the following examples, the assembly language instructions use the following nomenclature: "I[<number>] specifies the number of the instruction within the instruction block where the numbering begins at zero for the instruction following the instruction header and the instruction number is incremented for each successive instruction; the operation of the instruction (such as READ, ADDI, DIV, and the like) follows the instruction number; optional values (such as the immediate value 1) or references to registers (such as R0 for register 0) follow the operation; and optional targets that are to receive the results of the instruction follow the values and/or operation. Each of the targets can be to another instruction, a broadcast channel to other instructions, or a register that can be visible to another instruction block when the instruction block is committed. An example of an instruction target is T[1R] which targets the right operand of instruction 1. An example of a register target is W[R0], where the target is written to register 0.

In the diagram 400, two register Read instructions (430-431) can be used to initiate instruction block execution. The first two READ instructions 430 and 431 of the instruction block 420 target the right (T[2R]) and left (T[2L]) operands, respectively, of the ADD instruction 432. In the illustrated ISA, the read instruction is the only instruction that reads from the global register file; however any instruction can target, the global register file. When the ADD instruction 432 receives the result of both register reads it will become ready and execute. It is noted that the present disclosure sometimes refers to the right operand as OP0 and the left operand as OP1.

When the TLEI (test-less-than-equal-immediate) instruction 433 receives its single input operand from the ADD, it will become ready to issue and execute. The test then produces a predicate operand that is broadcast on channel one (B[1P]) to all instructions listening on the broadcast channel, which in this example are the two predicated branch instructions (BRO_T 434 and BRO_F 435). The branch that receives a matching predicate will fire (execute), but the other instruction, encoded with the complementary predicate, will not fire/execute.

A dependence graph 440 for the instruction block 420 is also illustrated, as an array 450 of instruction nodes and their corresponding operand targets stored in operand buffers 455 and 456, and predicate buffer 457. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R0 and R7 are written into the right and left operand buffers of ADD 432, marking the left and right operands of ADD 432 "ready." As a result, the ADD 432 instruction becomes ready, issues to an ALU, executes, and the sum is written to the left operand of the TLEI instruction 433.

The dependence graph 440 may also include the score board 247, which indicates a decoded ready state 448 and an active ready state 449. The decoded ready state is initialized by the instruction decoder, and the active ready state is initialized by the control unit during execution of the instructions. For example, the decoded ready state can encode whether a respective instruction has been decoded, awaits a predicate and/or some operand(s), perhaps via a broadcast channel, or is immediately ready to issue. The active ready state can encode whether a respective instruction awaits a predicate and/or some operand(s), is ready to issue, or has already issued. The decoded ready state can be cleared on a block reset or a block refresh. Upon branching to a new instruction block, the decoded ready state and the active ready state is cleared (a block or core reset). However, when an instruction block is re-executed on the core, such as when it branches back to itself (a block refresh), only active ready state is cleared. Block refreshes can occur immediately (when an instruction block branches to itself) or after executing a number of other intervening instruction blocks. The decoded ready state for the instruction block can thus be preserved so that it is not necessary to re-fetch and decode the block's instructions. Hence, block refresh can be used to save time and energy in loops and other repeating program structures.

In an example embodiment, the instruction block 420 includes two initial register Read instructions 430-431, which initiate execution of the block 420. More specifically, in lieu of having register Read commands in the header, register Read instructions may be included in the instruction block, where the register Read commands specify a target instruction and the result of the Read instruction is forwarded to an operand buffer of the target instruction. For example, as explained above, the initial two Read instructions 430-431 access registers R0 and R7 respectively, and the obtained data is forwarded to the right and left operand buffers of instruction #2 (an Add instruction). In this regard, the Read instructions can be executed and the result of the Read instructions is forwarded to an operand buffer of a subsequent instruction (e.g., 432).

The forwarding of the result from executing the Read instructions can be forwarded to the operand buffer of the subsequent instruction even before such instruction is fetched and decoded. For example, the decoded ready state 448 can indicate that the initial two Read instructions are decoded (i.e., decoded ready state bits 448 for instructions 430-431 are set to "1"). The active ready state 449 is also set to "1" as the Read instructions 430-431 have the information necessary for execution (e.g., which registers to access). The dependence graph 440 indicates the state bits 448-449 at a time when the initial 2 instructions 430-431 have executed but the Add instruction 432 has not yet been fetched or decoded. The active ready state 449 can be set to "1", indicating that the Add instruction 432 has all of its operand buffer data available (from execution of the two Read instructions 430-431). The add instruction 432 can be executed as soon as it is fetched and decoded.

As a comparison, a conventional out-of-order RISC or CISC processor would dynamically build the dependence graph at runtime, using additional hardware complexity, power, area and reducing clock frequency and performance. However, the dependence graph is known statically at compile time and an EDGE compiler can directly encode the producer-consumer relations between the instructions through the ISA, freeing the microarchitecture from rediscovering them dynamically. This can potentially enable a simpler microarchitecture, reducing area, power and boosting frequency and performance.

VII. Example Block-Based Instruction Formats

Figure 5:
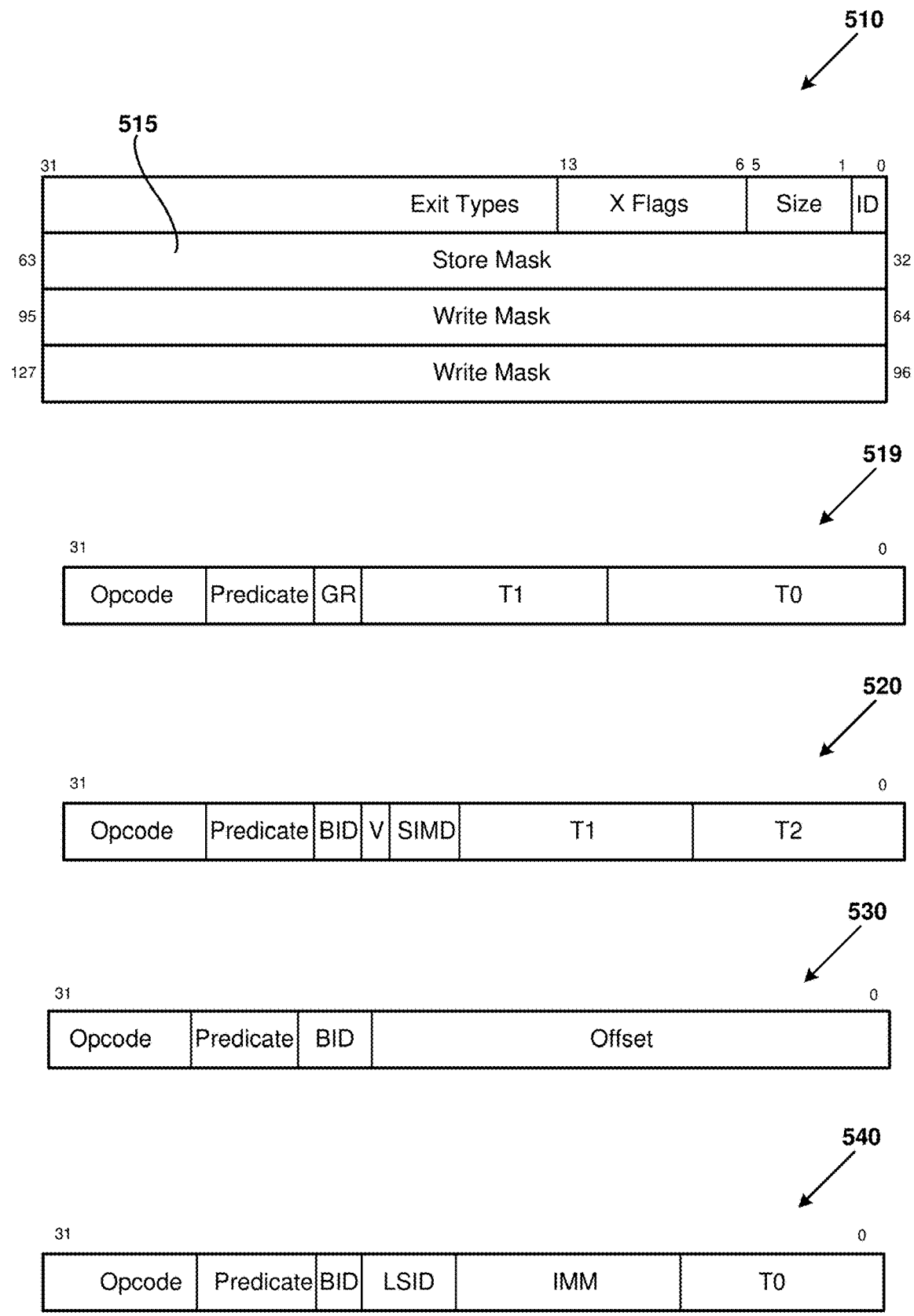
FIG. 5 illustrates block-based processor headers and instructions, as can be used in some examples of the disclosed technology.

FIG. 5 is a diagram illustrating generalized examples of instruction formats for an instruction header 510, a register READ instruction 519, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a store mask field 515, a number of exit type fields, a number of execution flag fields, an instruction block size field, and an instruction header ID bit (the least significant bit of the instruction header). For instruction blocks that have different numbers of store instructions on different predicate paths, one or more instructions can be nullified, and the executed count of store instructions incremented, such that each predicate path will indicate the same number of store instructions have executed at runtime.

The execution flag fields can indicate special instruction execution modes. For example, an "inhibit branch predictor" flag can be used to inhibit branch prediction for the instruction block when the flag is set. As another example, an "inhibit memory dependence prediction" flag can be used to inhibit memory dependence prediction for the instruction block when the flag is set. As another example, a "break after block" flag can be used to halt an instruction thread and raise an interrupt when the instruction block is committed. As another example, a "break before block" flag can be used to halt an instruction thread and raise an interrupt when the instruction block header is decoded and before the instructions of the instruction block are executed. As another example, a "debug mode" flag can be used to control whether the instruction block is executed in the default execution mode or the debug execution mode.

The exit type fields include data that can be used to indicate the types of control flow and/or synchronization instructions encoded within the instruction block. For example, the exit type fields can indicate that the instruction block includes one or more of the following: sequential branch instructions, offset branch instructions, indirect branch instructions, call instructions, return instructions, and/or break instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. In some examples, up to six exit types can be encoded in the exit type fields, and the correspondence between fields and corresponding explicit or implicit control flow instructions can be determined by, for example, examining control flow instructions in the instruction block.

The register READ instruction 519 includes an opcode field, a predicate field, a general register (GR) number (which identifies a general register to be read), and target fields (T0 and T1). The illustrated generic block instruction 520 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the length or width of the instruction 520 and the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specifying the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), a load store ID field (LSID), an immediate field (IMM) offset field, and a target field. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory). The LSID field specifies a relative order for load and store instructions within a block. In other words, a higher-numbered LSID indicates that the instruction should execute after a lower-numbered LSID. In some examples, the processor can determine that two load/store instructions do not conflict (e.g., based on the read/write address for the instruction) and can execute the instructions in a different order, although the resulting state of the machine should not be different than as if the instructions had executed in the designated LSID ordering. In some examples, load/store instructions having mutually exclusive predicate values can use the same LSID value. For example, if a first load/store instruction is predicated on a value p being true, and second load/store instruction is predicated on a value p being false, then each instruction can have the same LSID value.

VIII. Example States of a Processor Core

Figure 6:
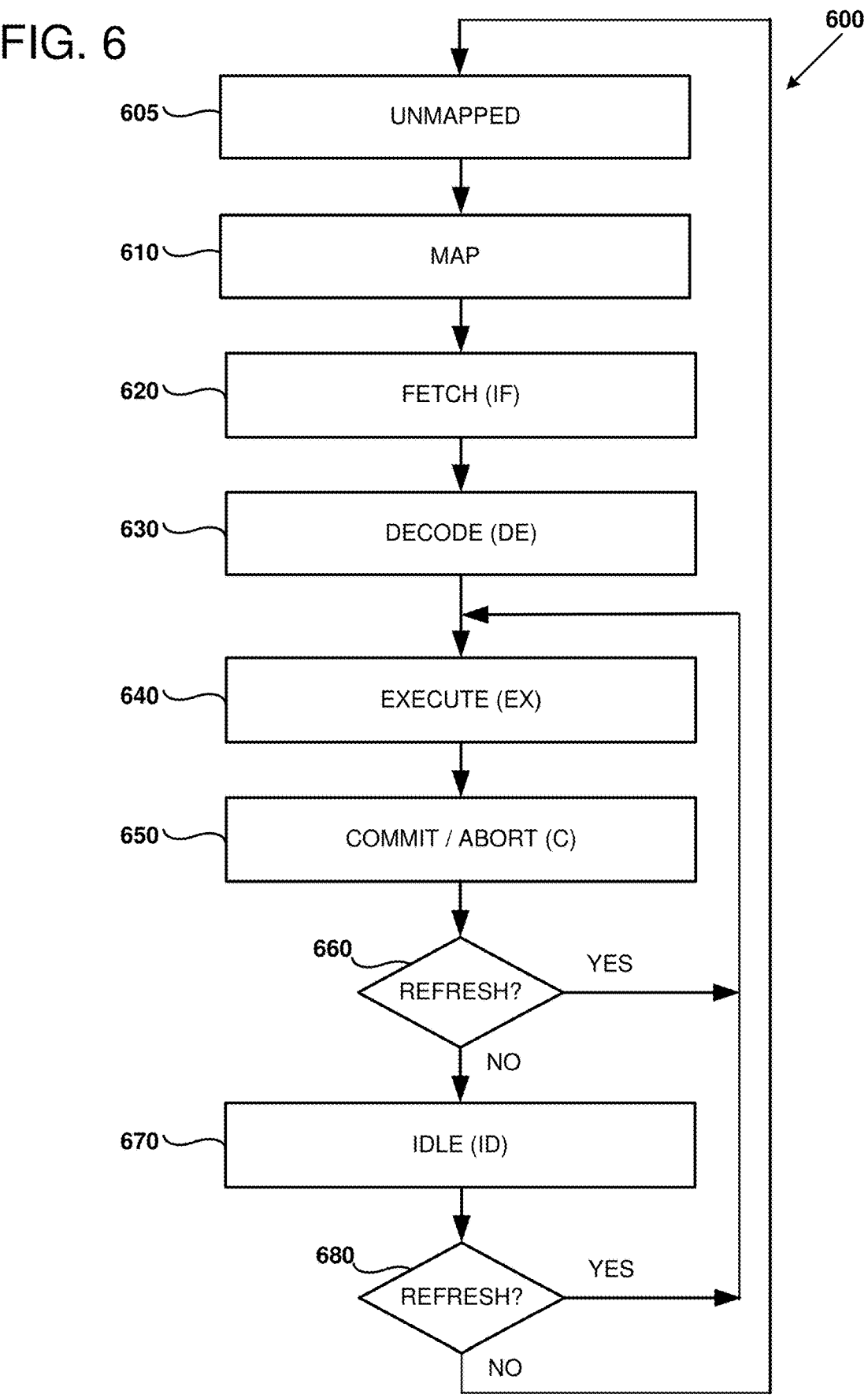
FIG. 6 is a flowchart illustrating an example of a progression of states of a processor core of a block-based processor.

FIG. 6 is a flowchart illustrating an example of a progression of states 600 of a processor core of a block-based computer. The block-based computer is composed of multiple processor cores that are collectively used to run or execute a software program. The program can be written in a variety of high-level languages and then compiled for the block-based processor using a compiler that targets the block-based processor. The compiler can emit code that, when run or executed on the block-based processor, will perform the functionality specified by the high-level program. The compiled code can be stored in a computer-readable memory that can be accessed by the block-based processor. The compiled code can include a stream of instructions grouped into a series of instruction blocks. During execution, one or more of the instruction blocks can be executed by the block-based processor to perform the functionality of the program. Typically, the program will include more instruction blocks than can be executed on the cores at any one time. Thus, blocks of the program are mapped to respective cores, the cores perform the work specified by the blocks, and then the blocks on respective cores are replaced with different blocks until the program is complete. Some of the instruction blocks may be executed more than once, such as during a loop or a subroutine of the program. An "instance" of an instruction block can be created for each time the instruction block will be executed. Thus, each repetition of an instruction block can use a different instance of the instruction block. As the program is run, the respective instruction blocks can be mapped to and executed on the processor cores based on architectural constraints, available hardware resources, and the dynamic flow of the program. During execution of the program, the respective processor cores can transition through a progression of states 600, so that one core can be in one state and another core can be in a different state.

At state 605, a state of a respective processor core can be unmapped. An unmapped processor core is a core that is not currently assigned to execute an instance of an instruction block. For example, the processor core can be unmapped before the program begins execution on the block-based computer. As another example, the processor core can be unmapped after the program begins executing but not all of the cores are being used. In particular, the instruction blocks of the program are executed, at least in part, according to the dynamic flow of the program. Some parts of the program may flow generally serially or sequentially, such as when a later instruction block depends on results from an earlier instruction block. Other parts of the program may have a more parallel flow, such as when multiple instruction blocks can execute at the same time without using the results of the other blocks executing in parallel. Fewer cores can be used to execute the program during more sequential streams of the program and more cores can be used to execute the program during more parallel streams of the program.

At state 610, the state of the respective processor core can be mapped. A mapped processor core is a core that is currently assigned to execute an instance of an instruction block. When the instruction block is mapped to a specific processor core, the instruction block is in-flight. An in-flight instruction block is a block that is targeted to a particular core of the block-based processor, and the block will be or is executing, either speculatively or non-speculatively, on the particular processor core. In particular, the in-flight instruction blocks correspond to the instruction blocks mapped to processor cores in states 610-650. A block executes non-speculatively when it is known during mapping of the block that the program will use the work provided by the executing instruction block. A block executes speculatively when it is not known during mapping whether the program will or will not use the work provided by the executing instruction block. Executing a block speculatively can potentially increase performance, such as when the speculative block is started earlier than if the block were to be started after or when it is known that the work of the block will be used. However, executing speculatively can potentially increase the energy used when executing the program, such as when the speculative work is not used by the program.

A block-based processor includes a finite number of homogeneous or heterogeneous processor cores. A typical program can include more instruction blocks than can fit onto the processor cores. Thus, the respective instruction blocks of a program will generally share the processor cores with the other instruction blocks of the program. In other words, a given core may execute the instructions of several different instruction blocks during the execution of a program. Having a finite number of processor cores also means that execution of the program may stall or be delayed when all of the processor cores are busy executing instruction blocks and no new cores are available for dispatch. When a processor core becomes available, an instance of an instruction block can be mapped to the processor core.

An instruction block scheduler can assign which instruction block will execute on which processor core and when the instruction block will be executed. The mapping can be based on a variety of factors, such as a target energy to be used for the execution, the number and configuration of the processor cores, the current and/or former usage of the processor cores, the dynamic flow of the program, whether speculative execution is enabled, a confidence level that a speculative block will be executed, and other factors. An instance of an instruction block can be mapped to a processor core that is currently available (such as when no instruction block is currently executing on it). In one embodiment, the instance of the instruction block can be mapped to a processor core that is currently busy (such as when the core is executing a different instance of an instruction block) and the later-mapped instance can begin when the earlier-mapped instance is complete.

At state 620, the state of the respective processor core can be fetch. For example, the IF pipeline stage of the processor core can be active during the fetch state. Fetching an instruction block can include transferring the block from memory (such as the L1 cache, the L2 cache, or main memory) to the processor core, and reading instructions from local buffers of the processor core so that the instructions can be decoded. For example, the instructions of the instruction block can be loaded into an instruction cache, buffer, or registers of the processor core. Multiple instructions of the instruction block can be fetched in parallel (e.g., at the same time) during the same clock cycle. The fetch state can be multiple cycles long and can overlap with the decode (630) and execute (640) states when the processor core is pipelined.

When instructions of the instruction block are loaded onto the processor core, the instruction block is resident on the processor core. The instruction block is partially resident when some, but not all, instructions of the instruction block are loaded. The instruction block is fully resident when all instructions of the instruction block are loaded. The instruction block will be resident on the processor core until the processor core is reset or a different instruction block is fetched onto the processor core. In particular, an instruction block is resident in the processor core when the core is in states 620-670.

At state 630, the state of the respective processor core can be decode. For example, the DC pipeline stage of the processor core can be active during the fetch state. During the decode state, instructions of the instruction block are being decoded so that they can be stored in the memory store of the instruction window of the processor core. In particular, the instructions can be transformed from relatively compact machine code, to a less compact representation that can be used to control hardware resources of the processor core. The decode state can be multiple cycles long and can overlap with the fetch (620) and execute (640) states when the processor core is pipelined. After an instruction of the instruction block is decoded, it can be executed when all dependencies of the instruction are met.

At state 640, the state of the respective processor core can be execute. The execute state can include various modes of operation, such as a default execution mode and a debug mode. During the default mode of the execute state, instructions of the instruction block are being executed. In particular, the EX and/or LS pipeline stages of the processor core can be active during the execute state. The instruction block can be executing speculatively or non-speculatively. A speculative block can execute to completion or it can be terminated prior to completion, such as when it is determined that work performed by the speculative block will not be used. When an instruction block is terminated, the processor can transition to the abort state. A speculative block can complete when it is determined the work of the block will be used, all register writes are buffered, all writes to memory are buffered, and a branch target is calculated, for example. A non-speculative block can execute to completion when all register writes are buffered, all writes to memory are buffered, and a branch target is calculated, for example. The execute state can be multiple cycles long and can overlap with the fetch (620) and decode (630) states when the processor core is pipelined. When the instruction block is complete, the processor can transition to the commit state.

During the debug mode of the execute state, instructions of the instruction block can be single-stepped or executed one at a time. For example, the processor core can be halted in the debug mode of the execute state, such as when a control signal is asserted or when the instruction header specifies that the debug mode is to be used for the instruction block. Upon receiving an indication to perform a single-step operation, one instruction of the instruction block can be executed. The intermediate state of the processor core can be scanned or read out of the processor core. The process can be repeated for the next instruction of the instruction block upon receiving another indication to perform a single-step operation. The "next" instruction can be determined based on a compiler-generated order, a scheduler-generated order, or an order generated outside of the processor core (such as by debug software running on a different core). The instructions of the block can continue to be single-stepped until the commit conditions are met, and then the processor can transition to the commit state.

At state 650, the state of the respective processor core can be commit or abort. During commit, the work of the instructions of the instruction block can be atomically committed so that other blocks can use the work of the instructions. In particular, the commit state can include a commit phase where locally buffered architectural state is written to architectural state that is visible to or accessible by other processor cores. When the visible architectural state is updated, a commit signal can be issued and the processor core can be released so that another instruction block can be executed on the processor core. During the abort state, the pipeline of the core can be halted to reduce dynamic power dissipation. In some applications, the core can be power gated to reduce static power dissipation. At the conclusion of the commit/abort states, the processor core can receive a new instruction block to be executed on the processor core, the core can be refreshed, the core can be idled, or the core can be reset.

At state 660, it can be determined if the instruction block resident on the processor core can be refreshed. As used herein, an instruction block refresh or a processor core refresh means enabling the processor core to re-execute one or more instruction blocks that are resident on the processor core. In one embodiment, refreshing a core can include resetting the active-ready state for one or more instruction blocks. It may be desirable to re-execute the instruction block on the same processor core when the instruction block is part of a loop or a repeated sub-routine or when a speculative block was terminated and is to be re-executed. The decision to refresh can be made by the processor core itself (contiguous reuse) or by outside of the processor core (non-contiguous reuse). For example, the decision to refresh can come from another processor core or a control core performing instruction block scheduling. There can be a potential energy savings when an instruction block is refreshed on a core that already executed the instruction as opposed to executing the instruction block on a different core. Energy is used to fetch and decode the instructions of the instruction block, but a refreshed block can save most of the energy used in the fetch and decode states by bypassing these states. In particular, a refreshed block can re-start at the execute state (640) because the instructions have already been fetched and decoded by the core. When a block is refreshed, the decoded instructions and the decoded ready state can be maintained while the active ready state is cleared. The decision to refresh an instruction block can occur as part of the commit operations or at a later time. If an instruction block is not refreshed, the processor core can be idled.

At state 670, the state of the respective processor core can be idle. The performance and power consumption of the block-based processor can potentially be adjusted or traded off based on the number of processor cores that are active at a given time. For example, performing speculative work on concurrently running cores may increase the speed of a computation but increase the power if the speculative misprediction rate is high. As another example, immediately allocating new instruction blocks to processors after committing or aborting an earlier executed instruction block may increase the number of processors executing concurrently, but may reduce the opportunity to reuse instruction blocks that were resident on the processor cores. Reuse may be increased when a cache or pool of idle processor cores is maintained. For example, when a processor core commits a commonly used instruction block, the processor core can be placed in the idle pool so that the core can be refreshed the next time that the same instruction block is to be executed. As described above, refreshing the processor core can save the time and energy used to fetch and decode the resident instruction block. The instruction blocks/processor cores to place in an idle cache can be determined based on a static analysis performed by the compiler or a dynamic analysis performed by the instruction block scheduler. For example, a compiler hint indicating potential reuse of the instruction block can be placed in the header of the block and the instruction block scheduler can use the hint to determine if the block will be idled or reallocated to a different instruction block after committing the instruction block. When idling, the processor core can be placed in a low-power state to reduce dynamic power consumption, for example.

At state 680, it can be determined if the instruction block resident on the idle processor core can be refreshed. If the core is to be refreshed, the block refresh signal can be asserted and the core can transition to the execute state (640). If the core is not going to be refreshed, the block reset signal can be asserted and the core can transition to the unmapped state (605). When the core is reset, the core can be put into a pool with other unmapped cores so that the instruction block scheduler can allocate a new instruction block to the core.

IX. Example Block-Based Processor and Memory Configuration

Figure 7:
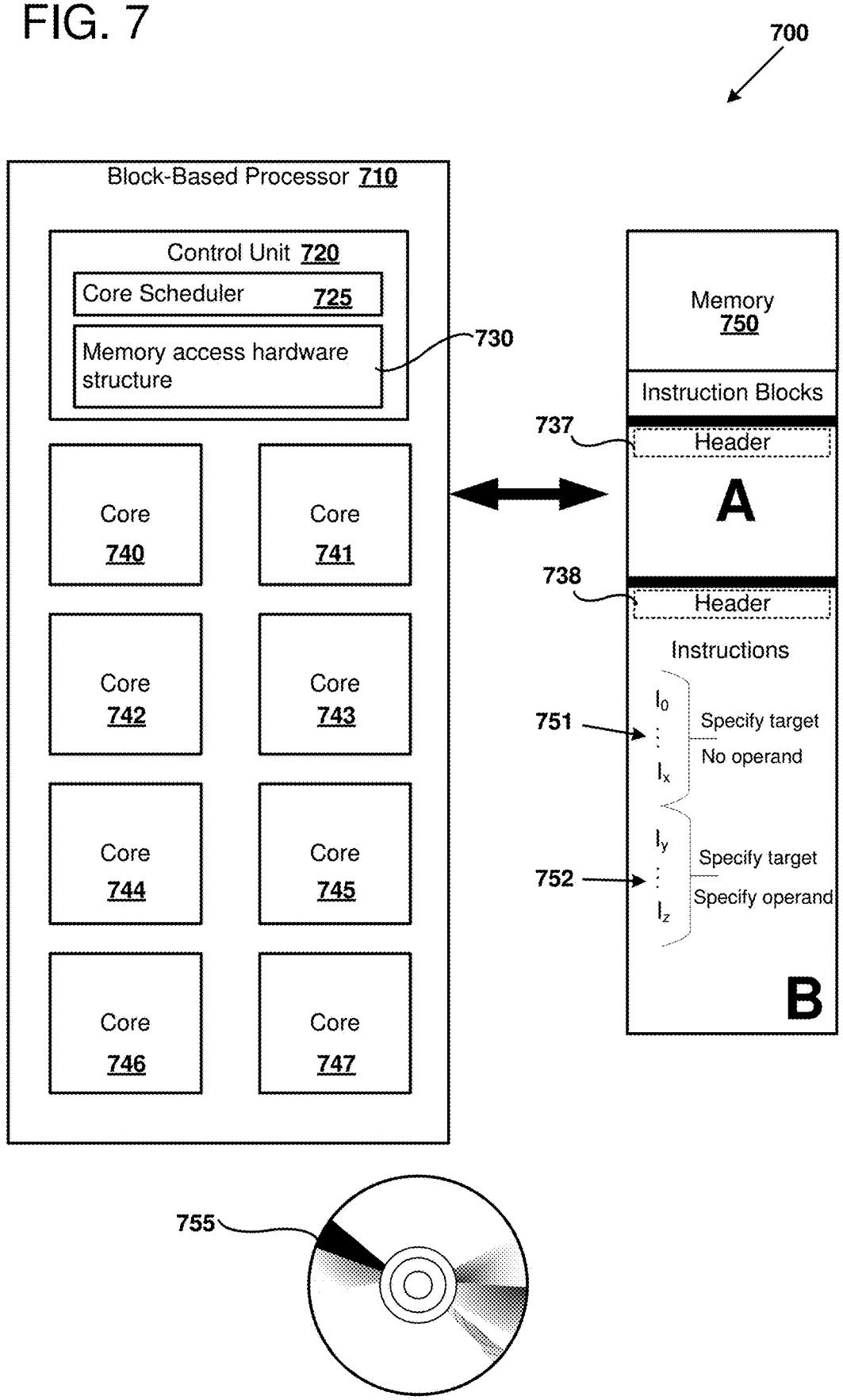
FIG. 7 illustrates a number of instructions blocks and processor cores, as can be used in some examples of the disclosed technology.

FIG. 7 is a diagram 700 illustrating an apparatus comprising a block-based processor 710, including a control unit 720 configured to execute instruction blocks according to data for one or more operation modes. The control unit 720 includes a core scheduler 725 and a memory access hardware structure 730. The core scheduler 725 schedules the flow of instructions including allocation and de-allocation of cores for performing instruction processing, control of input data and output data between any of the cores, register files, memory interfaces and/or I/O interfaces. The memory access hardware structure 730 stores data including, for example, store mask data and/or control flow data. The memory access hardware structure 730 can be implemented using any suitable technology, including SRAM, registers (e.g., including arrays of flip-flops or latches), or other suitable memory technology.

The block-based processor 710 includes one or more processor cores 740-747 configured to fetch and execute instruction blocks. The illustrated block-based processor 710 has up to eight cores, but in other examples there could be 64, 512, 1024, or other numbers of block-based processor cores. The block-based processor 710 is coupled to a memory 750, which includes a number of instruction blocks, including instruction blocks A and B, and to a computer-readable storage media disc 755, which may store computer-executable instructions for performing one or more methods described herein.

The instruction blocks A and B may include headers 737 and 738, respectively, as well as a plurality of instructions (e.g., as seen in FIG. 3). In an example embodiment and in reference to FIG. 7, an instruction block (e.g., block B) includes a first plurality of instructions 751 (i.e., instructions $I_0, \ldots, I_x$) and a second plurality of instructions 752 (i.e., instructions $I_y, \ldots, I_z$). The first plurality of instructions 751 may include instructions that specify a target (e.g., another instruction) without specifying an operand (i.e., without explicitly specifying an operand). An example instruction from the first plurality of instructions 751 is an Add instruction (e.g., instruction 432 in FIG. 4, which specifies the left operand of instruction #3 as a target, without specifying Add instruction operands; the Add instruction obtains its operands from operand buffers 455-456 by virtue of executing the Read instructions 430-431). The second plurality of instructions 752 may include instructions that specify a target (e.g., a target instruction to receive the result from executing the instruction) as well as at least one operand. An example instruction from the second plurality of instructions is a register Read instruction (e.g., instructions 430-431 in FIG. 4, which specify the right and left operand buffers of subsequent instruction 432 as targets, and registers R0 and R7 as operands indicating the data source). In an example embodiment, in lieu of having register Read commands in the instruction block header, an instruction block may use one or more register Read instructions (e.g., within instructions 752) as part of the instruction set.

In another example, the contents of the buffers 455-456 (e.g., the constants) can be stored in another location or can be stored together with the opcode in the array 450.

X. Examples of Block-Based Compiler Methods

Figure 8A:
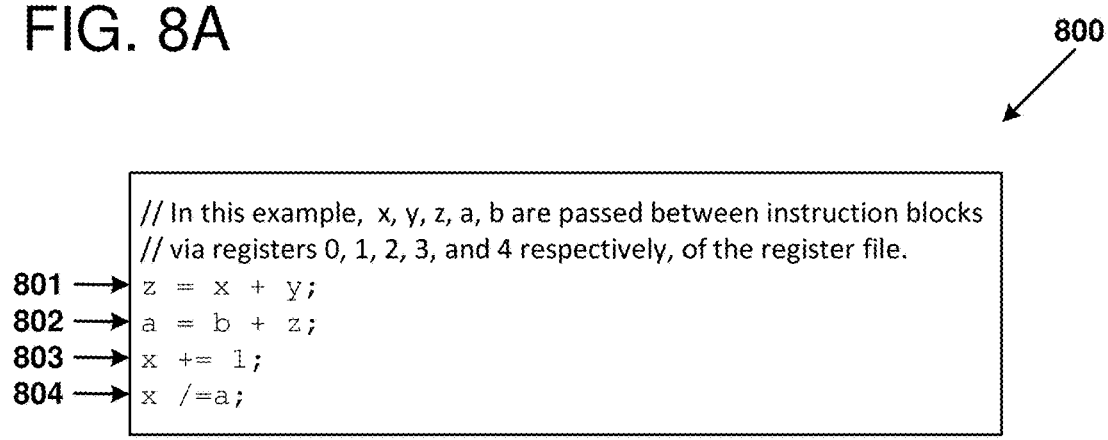
FIG. 8A is an example snippet of source code of a program for a block-based processor.
Figure 8B:
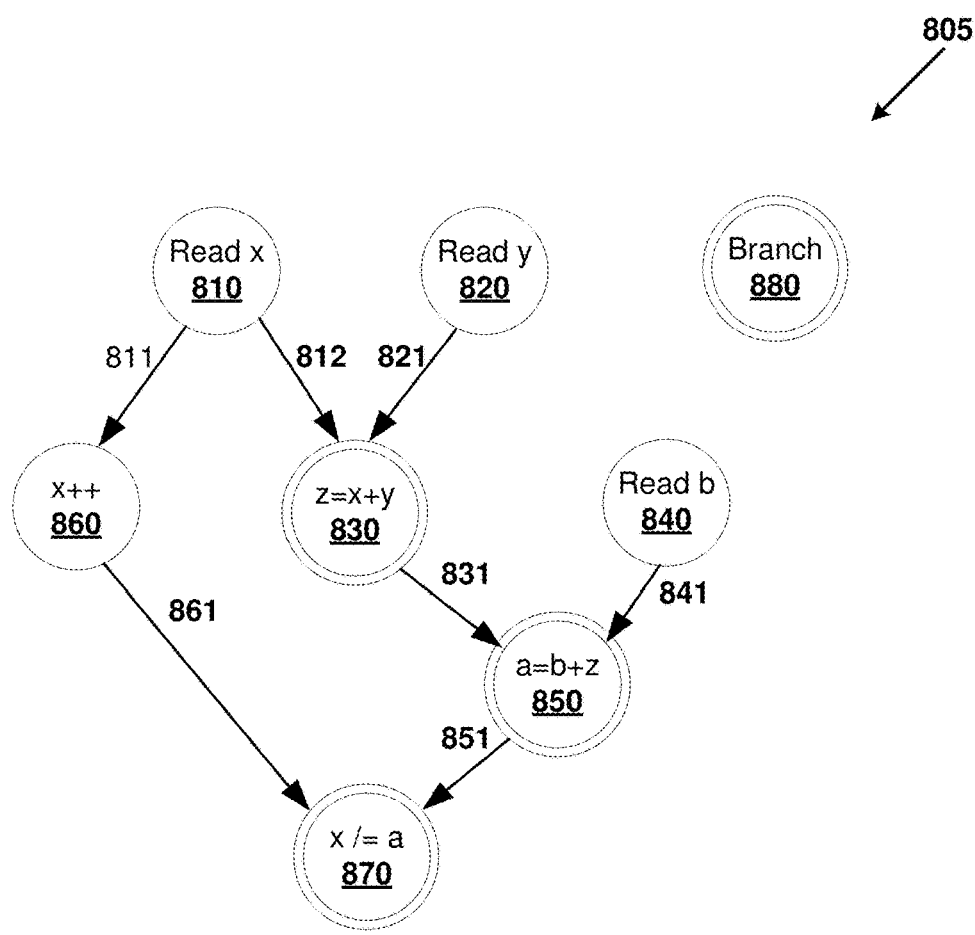
FIG. 8B is an example of a dependence graph of the example snippet of source code from FIG. 7A.

FIG. 8A is an example snippet of source code 800 of a program for a block-based processor. FIG. 8B is an example of a dependence graph 805 of the example snippet of source code 800 from FIG. 8A. In this example, the variables x, y, and z are updated using the source code statements 801-804. The source code 800 can be compiled or transformed into an instruction block that can be atomically executed on a processor core of a block-based processor.

Compiling the source code can include generating the dependence graph 805 by analyzing the source code 800, and emitting instructions of the instruction block using the dependence graph 805. The nodes (e.g., 810, 820, and 830) of the dependence graph 805 can represent operations to perform the function of the source code 800. For example, the nodes can directly correspond to operations to be performed by the processor core. Alternatively, the nodes can correspond to macro- or micro-operations to be performed by the processor core. The directed edges (e.g., 811, 812, and 821) connecting the nodes represent dependencies between the nodes. Specifically, consumer or target nodes are dependent on producer nodes generating a result, and thus producer nodes are executed before consumer nodes. The directed edges point from the producer node to the consumer node. In the block-atomic execution model, intermediate results are visible only within the processor core and final results are made visible to all of the processor cores when the instruction block is committed. The nodes producing intermediate results (810, 820, 840, and 860) are illustrated using single circles and the nodes producing final results (830, 850, 870, and 880) are illustrated using double circles.

As a specific example, the dependence graph 805 can be generated from at least the snippet of source code 800. The statement 801 generates three nodes (810, 820, and 830) of the dependence graph 805. The node 810 represents that the value of the variable x is read from a register or memory location. Similarly, the node 820 represents that the value of the variable y is read from a register or memory location. The values of x and y are consumed by the node 830 as represented by the edges 812 and 821, respectively. The node 830 represents that the values of x and y are added to generate the value stored in variable z.

The statement 802 can generate the nodes 840 and 850. The node 840 represents that the value of the variable b is read from a register or memory location. The values of z and b are consumed by the node 850 as represented by the edges 831 and 841, respectively. The node 850 represents that the values of z and b are added to generate the value stored in variable a.

The statement 803 can generate the node 8600 representing that the value of x is incremented. The node 860 consumes the value of x from node 810, as shown by edge 811, and the node 860 produces the value of x for node 870, as shown by edge 861. The statement 804 can generate the node 870 representing that the value of x is divided by the value of a to generate a new value for the variable x.

The node 880 does not directly correspond to any of the source code statements 801-804, but is generated as a consequence of the source code statements 801-804 being grouped within an instruction block. In some examples of the disclosed technology, an instruction block will have at least one branch to another instruction block of the program. The node 880 represents the branch to the next instruction block. The branch is not conditional on any of the other nodes of the dependence graph 805.

Compiling the source code 800 can include emitting instructions of the instruction block in a particular order. In a conventional non-block-based processor, dependencies between instructions are maintained by the ordering of the instructions, such that dependent instructions must come after the instructions they depend upon. In contrast, the instructions within an instruction block to be executed on a block-based processor can be emitted in any order because the dependencies are encoded within the instructions themselves and not in the order of the instructions. Specifically, the instruction scheduling logic of the block-based processor can ensure the proper order of execution because the scheduling logic will only issue instructions for execution when the dependencies of the instructions are satisfied. Thus, a compiler targeting a block-based processor may have more degrees of freedom in which to order the emitted instructions within the instruction block. For example, the instructions can be ordered based on various criteria, such as: a size of the instruction when the instructions have variable lengths (so that like-sized instructions are grouped together or so that the instructions maintain a particular alignment within the instruction block); a mapping of machine code instructions to source code statements; a type of the instruction (so that like-type instructions (e.g., having the same opcode) are grouped together or some types of instructions are ordered before other types); and/or a traversal of the dependence graph 805.

As seen in FIG. 8B, the register Read instructions initiate instruction block execution (e.g., instructions in nodes 810, 820), and are also used within the instruction block (e.g., register Read instruction of node 840).

Figures 9A, 9B:
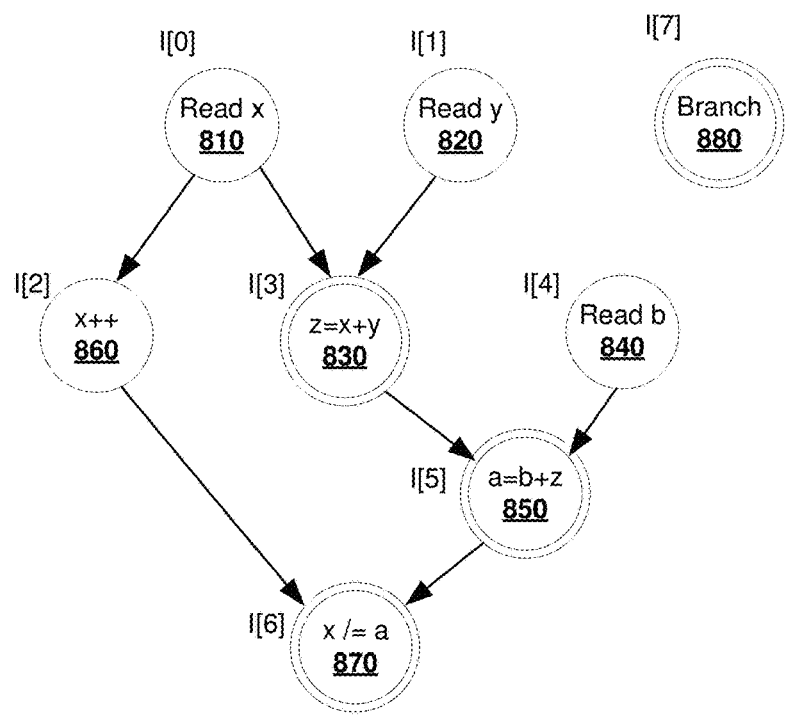
FIG. 9A is another example instruction block corresponding to the snippet of source code from FIG. 8A.
FIG. 9B is an example of a dependence graph of the example snippet of source code from FIG. 8A annotated with references to the instructions of the instruction block of FIG. 9A.

FIG. 9A is another example instruction block corresponding to the snippet of source code 800 from FIG. 8A. FIG. 9B is an example of an annotated dependence graph 905 generated by annotating the dependence graph 805 with references to the instructions of the instruction block 900. Specifically, the annotated dependence graph 905 is generated by performing a breadth-first traversal of the dependence graph 805. A first phase of the traversal includes identifying any nodes that have no dependencies. Specifically, the nodes 810, 820, 840, and 880 are traversed resulting in the instructions I[0], I[1], I[4], and I[7], respectively, being emitted for the instruction block 900. It should be noted that within a given phase of the traversal, the instructions corresponding to the traversed nodes can be emitted in any order. Specifically, there are three factorial (3!) possible orderings for the three instructions from the first phase. The next phase of the traversal includes identifying any nodes that only have dependencies from nodes that have been previously traversed in an earlier phase of the traversal. Specifically, the nodes 860, 830, and 850 are traversed resulting in the instructions I[2], I[3], and I[5], respectively, being emitted for the instruction block 900. The phases of the traversal can continue until there are no nodes left to traverse. In the final phase of the traversal, the node 870 is traversed resulting in the instruction I[6] being emitted for the instruction block 900.

In the illustrated example, none of the instructions of the instruction block 900 have backwards references to instruction targets. In other words, the instructions either have no reference to an instruction target (e.g., the I[7] branch instruction and the I[6] div instruction) or a forward reference to an instruction target (e.g., the I[0] and I[1] read instructions, the I[2] add immediate instruction, the I[3] add instruction, the I[4] read instruction, and the I[5] add instruction). Thus, any dependency of any instruction of the instruction block 900 will be from an instruction earlier in the order. During operation, the instructions of the instruction block 900 can be sequentially executed because the operands for every instruction will be ready before the instructions are executed. For example, the result of the register read instructions I[0] and I[1] are forwarded to the operand buffers of the subsequent add instruction I[3]. The execution of the initial Read instructions I[0] and I[1] and storing of the result in the operand buffers of I[3] can take place even before instruction I[3] is fetched and decoded. In this regard, instruction I[3] can execute as soon as it is fetched and decoded, since it will have available all of its operands.

XI. Example Source and Object Code

FIG. 10 illustrates example source 1010 and assembly code 1020 as can be used in certain examples of the disclosed technology. The source code 1010 includes an if/else statement. Statements within each portion of the if/else statement include a number of memory reads and memory writes to arrays A and B, including a predicated register Read instruction, as illustrated in FIG. 10. When the source code 1010 is transformed to object code, a number of load and store assembly instructions will be generated.

The assembly code 1020 for the source code portion 1010 includes 26 instructions numbered 0 through 25. The assembly instructions indicate a number of fields for example an instruction op code pneumonic, a source data specified by the instruction, for example, broadcast identifiers or immediate arguments, load store ID identifiers, and target designations. The assembly code includes register read instructions (0-2 and 17) a register write instruction (instruction 25), arithmetic instructions (e.g., instructions 3 and 4), and move instructions for sending data to multiple targets (e.g., move instructions 5 and 6). The assembly code 1020 also includes a test instruction (predicated instruction) 11, which is a test if greater than instruction that will generate a predicate value on broadcast channel 2. Further, the assembly code includes two unpredicated memory load instructions 7 and 8, and one predicated load instruction 16. Load instruction 24 is also not predicated. The assembly code 1020 also includes a number of memory store instructions, which will store data to a memory address, for example, predicated store instructions 12, 13, and 19, as well as unpredicated store instruction 22.

As shown in the assembly code 1020, each of the load and store instructions has been assigned a unique LSID. For example load instruction 7 is assigned to LSID 0, load instruction 8 is assigned to LSID 1, and predicated store instruction 12 is assigned to LSID 2. The LSIDs indicate a relative ordering in which the instructions are to be executed. For example, instructions 12 and 13 are dependent on load instructions 7 and 8 executing first. This order is enforced, as the load instructions 7 and 8 are used to generate values that will be stored by the store instructions 12 and 13. In some examples, two or more load store instructions can share an LSID. In some examples, the LSIDs are required by an instruction set architecture to be contiguous, while in other examples, the LSIDs can be sparse (e.g., intermediate LSID values are skipped). It should also be noted that in some examples, speculative or out-of-order execution of instructions in a block can be performed, but the processor must still maintain semantics as if the memory dependencies specified by the LSID was not violated. The assembly code portion 1020 can be converted to machine code for actual execution by a block-based processor.

As shown in FIG. 10, the assembly code 1020 also includes a predicated Read instruction 17. More specifically, the predicated register Read instruction is used to obtain a value for the variable s in instances when the "else" statement in code portion 1010 has to execute. The result of the predicated register Read instruction 17 is forwarded to the left operand buffer of subsequent instruction 18.

XII. Example Methods of Instruction Block Execution

Figure 12:
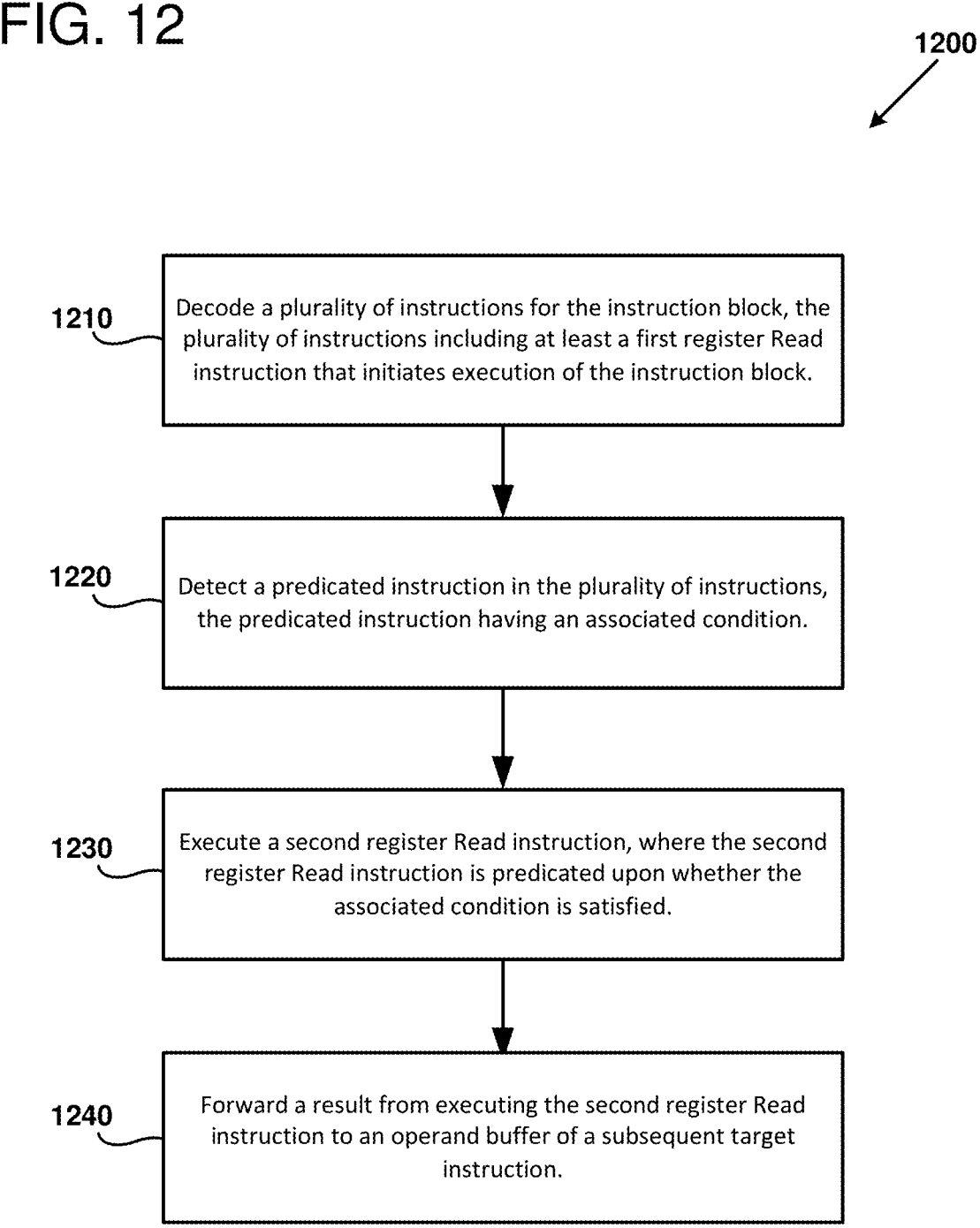

FIGS. 11-12 are flowchart outlining example methods of instruction block execution, as can be used in certain examples of the disclosed technology. Referring to FIG. 11, the example method 100 starts at 1110, when at least one register access instruction is detected during instruction execution. For example and in reference to FIG. 4, two initial register Read instructions 430-431 can be detected during instruction execution. The at least one register access instruction specifies a target instruction and a data source operand. For example, register Read instruction 430 specifies register R0 as the data source and the right operand of instruction I[2] as the target. At 1120, a register of the processor core is accessed, where the register is associated with the data source operand. For example, register R0 is accessed when instruction 430 is executed. At 1130, data is retrieved from the register. At 1140, the data is forwarded to an operand buffer of the target instruction prior to fetching of the target instruction. For example, instructions 430-431 can execute prior to fetching of instruction 432. In this regard, the operand buffer of instruction 432 will have all of its operand values from instructions 430-431, and instruction 432 can execute as soon as it is fetched and decoded.

Referring to FIGS. 10 and 12, the example method 1200 starts at 1210, when a plurality of instructions for an instruction block are decoded. For example, instructions 0-25 in the assembly code 1020 can be decoded into an instruction window. The plurality of instructions include at least a first register Read instruction (e.g., instruction 0 is a register Read instruction) that initiates execution of the instruction block. At 1220, a predicated instruction in the plurality of instructions is detected, the predicated instruction having an associated condition. For example, the predicated instruction is instruction 11 in FIG. 10, which is predicated upon the condition a[i]>a[i+1]. At 1230, a second register Read instruction is executed, where the second register Read instruction is predicated upon whether the associated condition is satisfied. For example, instruction 17 is a predicated register Read instruction, which will execute when the condition associated with instruction 11 is not satisfied (i.e., instruction 17 will execute when a[i]<a[i+1]). At 1240, a result from executing the second register Read instruction is forwarded to an operand buffer of a subsequent target instruction. For example, the result from executing the predicated register Read instruction number 17 is forwarded to the left operand buffer of instruction number 18.

XIII. Exemplary Computing Environment

Figure 13:
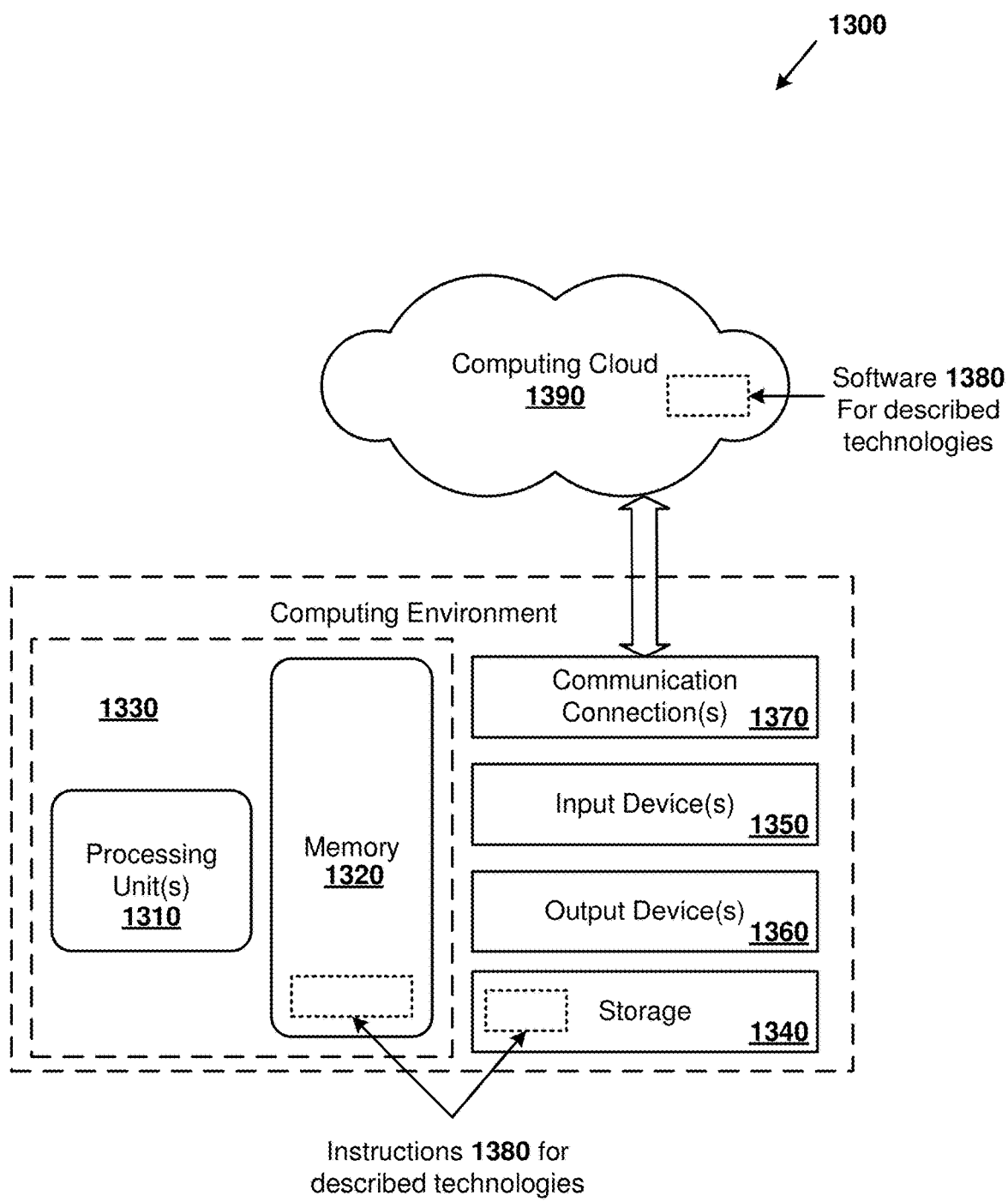
FIG. 13 is a block diagram illustrating a suitable computing environment for implementing some embodiments of the disclosed technology.

FIG. 13 illustrates a generalized example of a suitable computing environment 1300 in which described embodiments, techniques, and technologies, including configuring a block-based processor, can be implemented. For example, the computing environment 1300 can implement disclosed techniques for configuring a processor to operating according to one or more instruction blocks, or compile code into computer-executable instructions for performing such operations, as described herein.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 13, the computing environment 1300 includes at least one block-based processing unit 1310 and memory 1320. In FIG. 13, this most basic configuration 1330 is included within a dashed line. The block-based processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input device(s) 1350, one or more output device(s) 1360, and one or more communication connection(s) 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, plugin data, and messages, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fiber Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, disclosed compilers and/or block-based-processor servers are located in the computing environment, or the disclosed compilers can be executed on servers located in the computing cloud 1390. In some examples, the disclosed compilers execute on traditional central processing units (e.g., RISC or CISC processors).

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals.

XIV. Additional Examples of the Disclosed Technology

Additional examples of the disclosed subject matter are discussed herein in accordance with the examples discussed above. It will be readily understood by one of ordinary skill in the art that the exemplary systems, methods, and apparatus described herein should not be construed as being limiting in any way, and are not limited to any specific aspect or feature or combinations thereof.

In some examples of the disclosed technology, an apparatus includes memory and one or more block-based processor cores configured to execute at least one instruction block. The at least one instruction block encodes a data-flow instruction set architecture (ISA). The data-flow ISA includes a first plurality of instructions and a second plurality of instructions. One or more of the first plurality of instructions specify at least a first target instruction without specifying a data source operand. One or more of the second plurality of instructions specify at least a second target instruction and a data source operand that specifies a register. One or more of the plurality of processor cores includes a register file, and the data source operand points to the register file. The second plurality of instructions includes at least one Read instruction. A result from executing the at least one Read instruction is forwarded to an operand buffer of at least a third target instruction, prior to fetching the third target instruction. The result can also be forwarded prior to issue or execution of the third target instruction. One or more of the plurality of processor cores is configured to execute the at least one Read instruction prior to completion of fetching the at least one instruction block. At least one Read instruction is an initial instruction of the at least one instruction block. The one or more of the second plurality of instructions specify a pointer to the second target instruction. The data-flow ISA includes a predicated instruction associated with a condition. The second plurality of instructions includes a register Read instruction, and execution of the register Read instruction is predicated upon whether the condition is satisfied.

In some examples of the disclosed technology, a method of operating a processor to execute an instruction block (the block comprising an instruction block header and a plurality of instructions) includes detecting at least one register access instruction during instruction execution, the at least one register access instruction specifying a target instruction and a data source operand; accessing a register of the processor core, the register associated with the data source operand; retrieving data from the register; and forwarding the data to an operand buffer of the target instruction. The data is forwarded to the operand buffer of the target instruction prior to fetching the target instruction (and/or prior to issuing or execution of the target instruction). In some examples, instead of writing result to an operand buffer, dependent instructions can pick up input from a result bus, thereby avoiding writing the result to an operand buffer. The target instruction is decoded subsequent to the at least one register access instruction. The at least one register access instruction is a register Read instruction predicated upon satisfaction of a condition associated with a predicated instruction. The at least one register access instruction is a register Read instruction. Execution of one or more instructions dependent upon the at least one register access instruction can be initiated, upon decoding the at least one register access instruction. The at least one register access instruction is executed prior to completion of fetching the plurality of instructions for the instruction block. The instruction block comprises a plurality of register Read instructions that are part of only the plurality of instructions and not the instruction block header.

In some examples of the disclosed technology, one or more computer-readable storage media storing computer-readable instructions that when executed by a block-based processor, cause the processor to perform a method, the computer-readable instructions including instructions for decoding a plurality of instructions for the instruction block. The plurality of instructions include at least a first register Read instruction that initiates execution of the instruction block. The computer-readable instructions further include instructions for detecting a predicated instruction in the plurality of instructions, the predicated instruction having an associated condition. The computer-readable instructions further include instructions for executing a second register Read instruction, wherein the second register Read instruction is predicated upon whether the associated condition is satisfied. The computer-readable instructions further include instructions for forwarding a result from executing the second register Read instruction to an operand buffer of a subsequent target instruction.

The computer-readable instructions further include instructions for forwarding the result to the operand buffer prior to fetching the target instruction. In some example embodiments, register allocating predicates may be used. In this case, the predicate can be stored in a register file (e.g., a dedicated predicate register file or a general register file). The predicate can be obtained (read) with a Read instruction, and another instruction (e.g., another Read instruction) can be the target for the Read instruction used to obtain the predicate. In this regard, the register operand that is read with a Read instruction can be a predicate.

The computer-readable instructions further include instructions for executing a third register Read instruction for reading a value from a register, where a target operand of the third register Read instruction is a broadcast of the value read from the register.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. A block-based computing system, comprising:
 a plurality of processor cores configured to execute at least one instruction block, the at least one instruction block encoding a data-flow instruction set architecture (ISA) comprising:
  a Read instruction specifying a target instruction and a data source operand that specifies a register and wherein a result from executing the Read instruction is forwarded to an operand buffer accessed by the target instruction prior to fetching the target instruction; and
  the target instruction, which does not specify the register as a data source operand.

2. The block-based computing system of claim 1, wherein one or more of the plurality of processor cores comprise a register file, and the data source operand points to the register file.

3. The block-based computing system of claim 1, wherein one or more of the plurality of processor cores is configured to execute the Read instruction prior to completion of fetching the at least one instruction block.

4. The block-based computing system of claim 1, wherein the Read instruction is an initial instruction of the at least one instruction block.

5. The block-based computing system of claim 1, wherein one or more instructions in the instruction block specify a pointer to the target instruction.

6. The block-based computing system of claim 1, wherein the data-flow ISA comprises a predicated instruction associated with a condition.

7. The block-based computing system of claim 6, wherein one or more other instructions in the instruction block comprise a register Read instruction, and wherein execution of the register Read instruction is predicated upon whether the condition is satisfied.

8. A method of operating a processor to execute an instruction block, the instruction block comprising an instruction block header and a plurality of instructions, the method comprising:

detecting at least one register access instruction during instruction execution, the at least one register access instruction specifying a target instruction and a data source operand;
 accessing a register of the processor, the register associated with the data source operand;
 retrieving data from the register; and
 forwarding the data to an operand buffer of the target instruction, wherein the data is forwarded to the operand buffer of the target instruction prior to fetching the target instruction.

9. The method according to claim 8, wherein the target instruction is decoded subsequent to the at least one register access instruction.

10. The method according to claim 8, wherein the at least one register access instruction is a register Read instruction predicated upon satisfaction of a condition associated with a predicated instruction.

11. The method according to claim 8, wherein the at least one register access instruction is a register Read instruction.

12. The method according to claim 8, further comprising:
 initiating execution of one or more instructions dependent upon the at least one register access instruction, upon decoding the at least one register access instruction.

13. The method according to claim 8, wherein the at least one register access instruction is executed prior to completion of fetching the plurality of instructions for the instruction block.

14. The method according to claim 8, wherein the instruction block comprises a plurality of register Read instructions that are part of only the plurality of instructions and not the instruction block header.

15. One or more computer-readable storage media storing computer-readable instructions that when executed by a block-based processor, cause the processor to perform the method of claim 8.

16. One or more computer-readable storage media storing computer-readable instructions for an instruction block that when executed by a block-based processor, cause the processor to perform a method, the computer-readable instructions comprising instructions that cause the processor to:
 decode a plurality of instructions for the instruction block, the plurality of instructions comprising at least a first register Read instruction that initiates execution of the instruction block;
 detect a predicated instruction in the plurality of instructions, the predicated instruction having an associated condition;
 execute a second register Read instruction, wherein the second register Read instruction is predicated upon whether the associated condition is satisfied; and
 prior to fetching a subsequent target instruction, forward a result from executing the second register Read instruction to an operand buffer of the subsequent target instruction.

17. The computer-readable storage media of claim 16, wherein the computer-readable instructions further cause the processor to:
 execute a third register Read instruction for reading a value from a register, wherein a target operand of the third register Read instruction is a broadcast of the value read from the register.

18. The block-based computing system of claim 1, wherein execution of the Read instruction is predicated on a condition generated by another instruction in the at least one instruction block.

19. The method according to claim 8, wherein execution of the register access instruction is predicated on a condition generated by another instruction in the plurality of instructions.

20. The method according to claim 8, further comprising:
- subsequent to executing the target instruction, refreshing the instruction block; and
- re-executing the instruction block without re-fetching or re-decoding the instruction block.

* * * * *